United States Patent
Ando

(10) Patent No.: US 11,429,319 B2
(45) Date of Patent: Aug. 30, 2022

(54) INFORMATION PROCESSING SYSTEM, INFORMATION PROCESSING APPARATUS, INFORMATION PROCESSING METHOD, AND MEDIUM FOR CONTROLLING DEVICE BASED ON DEVICE AND USER IDENTIFICATION INFORMATION

(71) Applicant: Ricoh Company, Ltd., Tokyo (JP)

(72) Inventor: Mitsuo Ando, Fukuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/976,294

(22) PCT Filed: Mar. 4, 2019

(86) PCT No.: PCT/JP2019/008462
§ 371 (c)(1),
(2) Date: Aug. 27, 2020

(87) PCT Pub. No.: WO2019/172199
PCT Pub. Date: Sep. 12, 2019

(65) Prior Publication Data
US 2021/0042064 A1    Feb. 11, 2021

(30) Foreign Application Priority Data

Mar. 5, 2018  (JP) .............................. JP2018-039122
Sep. 27, 2018  (JP) .............................. JP2018-182887

(51) Int. Cl.
*G06F 3/12*   (2006.01)
*H04N 1/00*   (2006.01)

(52) U.S. Cl.
CPC .......... *G06F 3/1204* (2013.01); *G06F 3/1238* (2013.01); *H04N 1/0023* (2013.01); *H04N 2201/0094* (2013.01)

(58) Field of Classification Search
None
See application file for complete search history.

(56) References Cited

U.S. PATENT DOCUMENTS 7,533,381 B2    5/2009  Ando
7,554,685 B2    6/2009  Akiyoshi et al.
(Continued)

FOREIGN PATENT DOCUMENTS

EP     2840482 A1    2/2015
JP   2013-077279     4/2013
(Continued)

OTHER PUBLICATIONS

International Search Report and Written Opinion dated Jun. 11, 2019 in PCT/JP2019/008462 filed on Mar. 4, 2019.
(Continued)

*Primary Examiner* — Thomas D Lee
(74) *Attorney, Agent, or Firm* — Xsensus LLP

(57) ABSTRACT

A disclosed information processing system includes a terminal, and an information processing apparatus. The terminal includes an acquisition unit configured to acquire first identification information from outside, and a transmitter configured to transmit the first identification information and second identification information for identifying a user of the terminal to the information processing apparatus. The information processing apparatus includes a receiver configured to receive the first identification information and the second identification information, and a controller configured to cause a device associated with a combination of the first identification information and the second identification information received by the receiver to execute a process.

21 Claims, 37 Drawing Sheets

(56) References Cited

U.S. PATENT DOCUMENTS

| | | |
|---|---|---|
| 7,636,172 B2 | 12/2009 | Akiyoshi et al. |
| 7,812,978 B2 | 10/2010 | Ando et al. |
| 8,305,591 B2 | 11/2012 | Akiyoshi et al. |
| 8,522,229 B2 | 8/2013 | Ando et al. |
| 8,605,298 B2 | 12/2013 | Ando et al. |
| 8,752,041 B2 | 6/2014 | Akiyoshi et al. |
| 8,819,665 B2 | 8/2014 | Ando et al. |
| 8,988,693 B2 | 3/2015 | Ando |
| 9,003,394 B2 | 4/2015 | Ando |
| 9,019,516 B2 | 4/2015 | Akiyoshi et al. |
| 9,124,733 B2 | 9/2015 | Ando |
| 9,135,468 B2 | 9/2015 | Ando |
| 9,141,374 B2 | 9/2015 | Ando |
| 9,164,865 B2 | 10/2015 | Ando et al. |
| 9,167,113 B2 | 10/2015 | Akiyoshi et al. |
| 9,235,453 B2 | 1/2016 | Ando |
| 9,374,490 B2 | 6/2016 | Ando |
| 9,544,473 B2 | 1/2017 | Namihira et al. |
| 9,729,617 B2 | 8/2017 | Naito et al. |
| 9,792,159 B2 | 10/2017 | Ando |
| 10,136,021 B2 | 11/2018 | Ando |
| 2008/0005029 A1 | 1/2008 | Ando |
| 2015/0036167 A1 | 2/2015 | Naitoh et al. |
| 2015/0049359 A1 | 2/2015 | Lee et al. |
| 2016/0342577 A1 | 11/2016 | Ando |
| 2017/0102865 A1 | 4/2017 | Ando |
| 2017/0339232 A1 | 11/2017 | Ando |
| 2018/0084121 A1 | 3/2018 | Ando |
| 2018/0176417 A1 | 6/2018 | Ando |
| 2019/0037624 A1* | 1/2019 | Tokuchi ................ H04W 12/77 |

FOREIGN PATENT DOCUMENTS

| | | |
|---|---|---|
| JP | 2014-149633 | 8/2014 |
| JP | 2017-173891 | 9/2017 |
| WO | 2013/059190 A1 | 4/2013 |
| WO | 2018/236136 A1 | 12/2018 |

OTHER PUBLICATIONS

Office Action dated Jun. 13, 2022 in European Patent Application No. 19 712 309.4, 7 pages.

* cited by examiner

[Fig. 1]
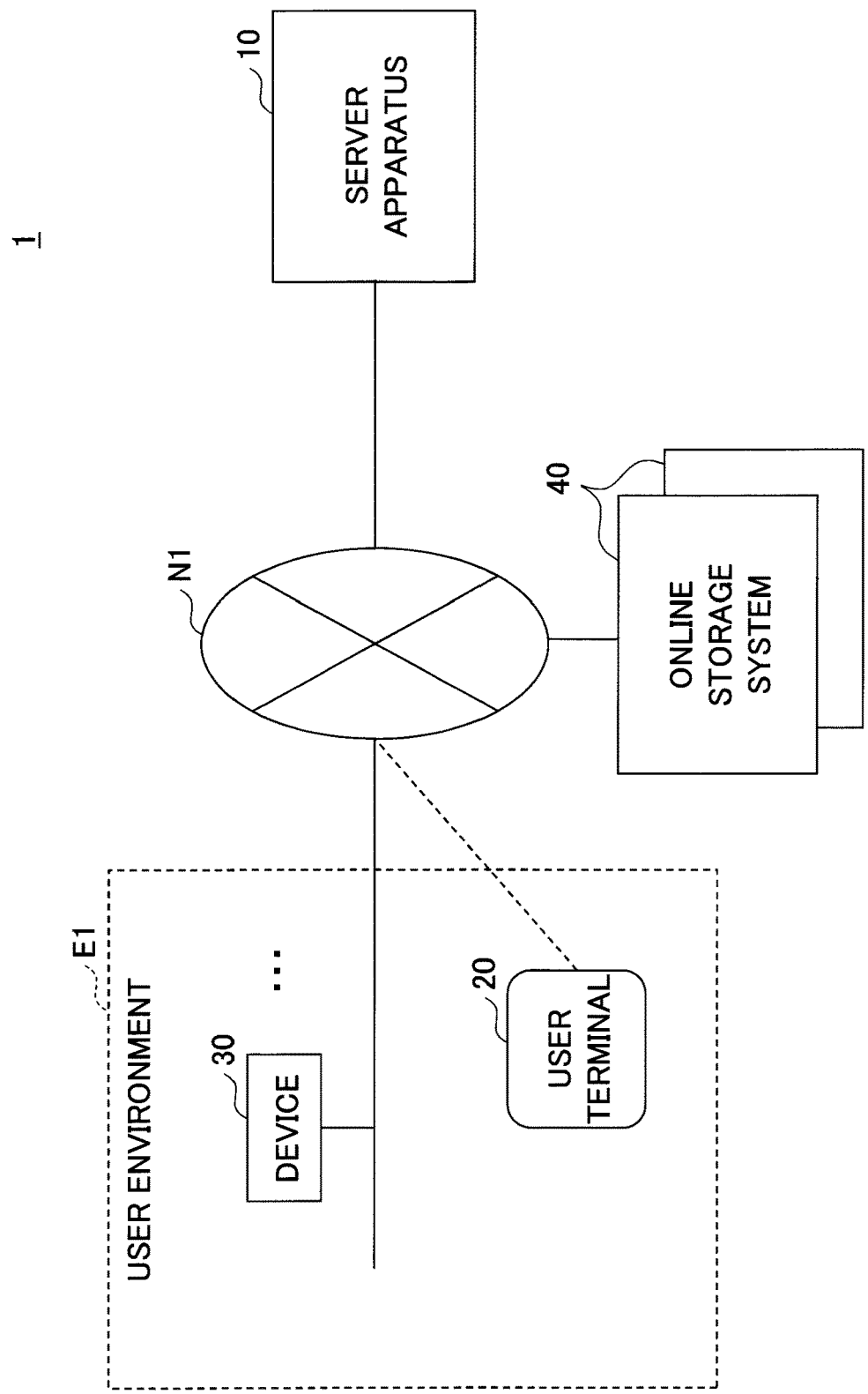

[Fig. 2]
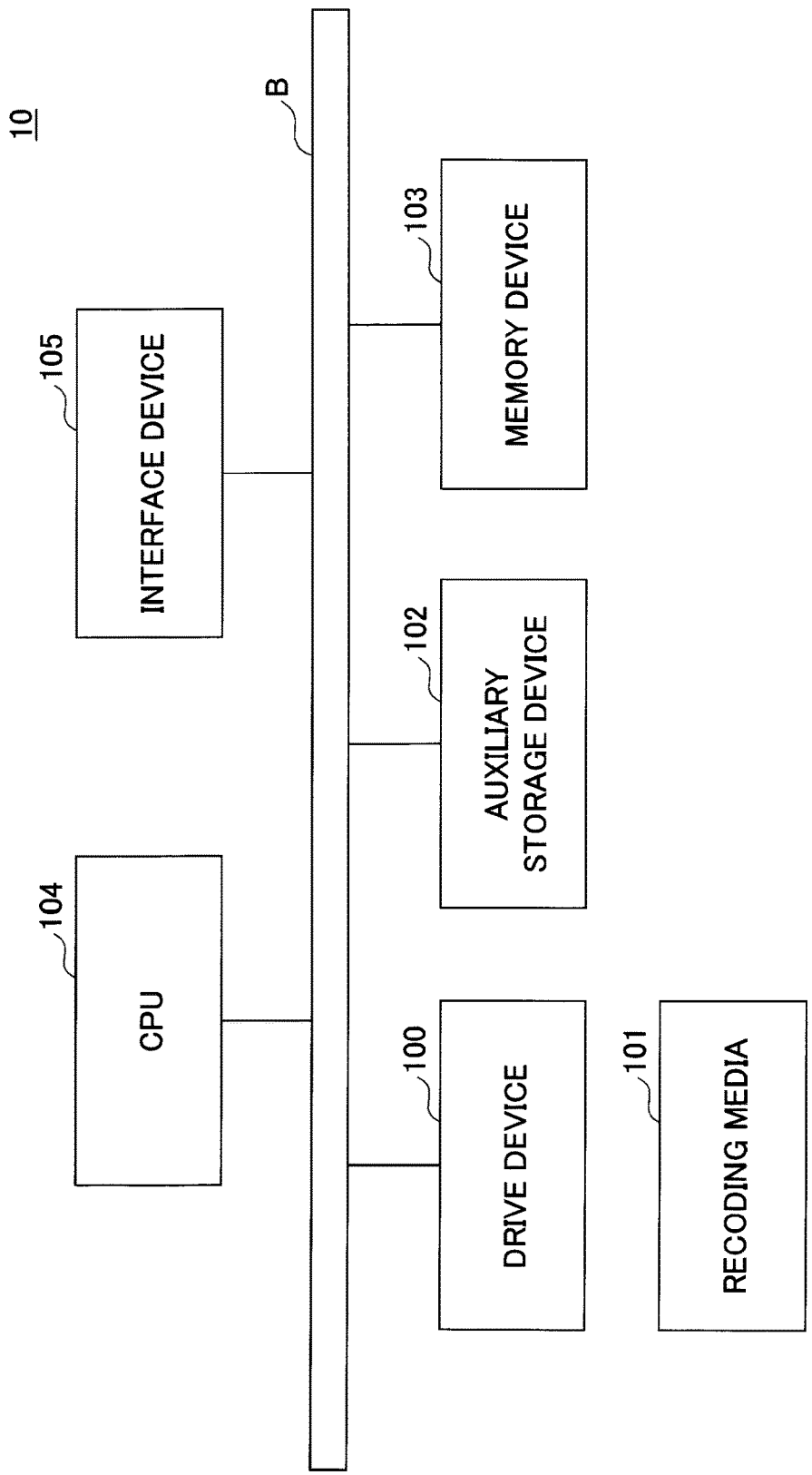

[Fig. 3]
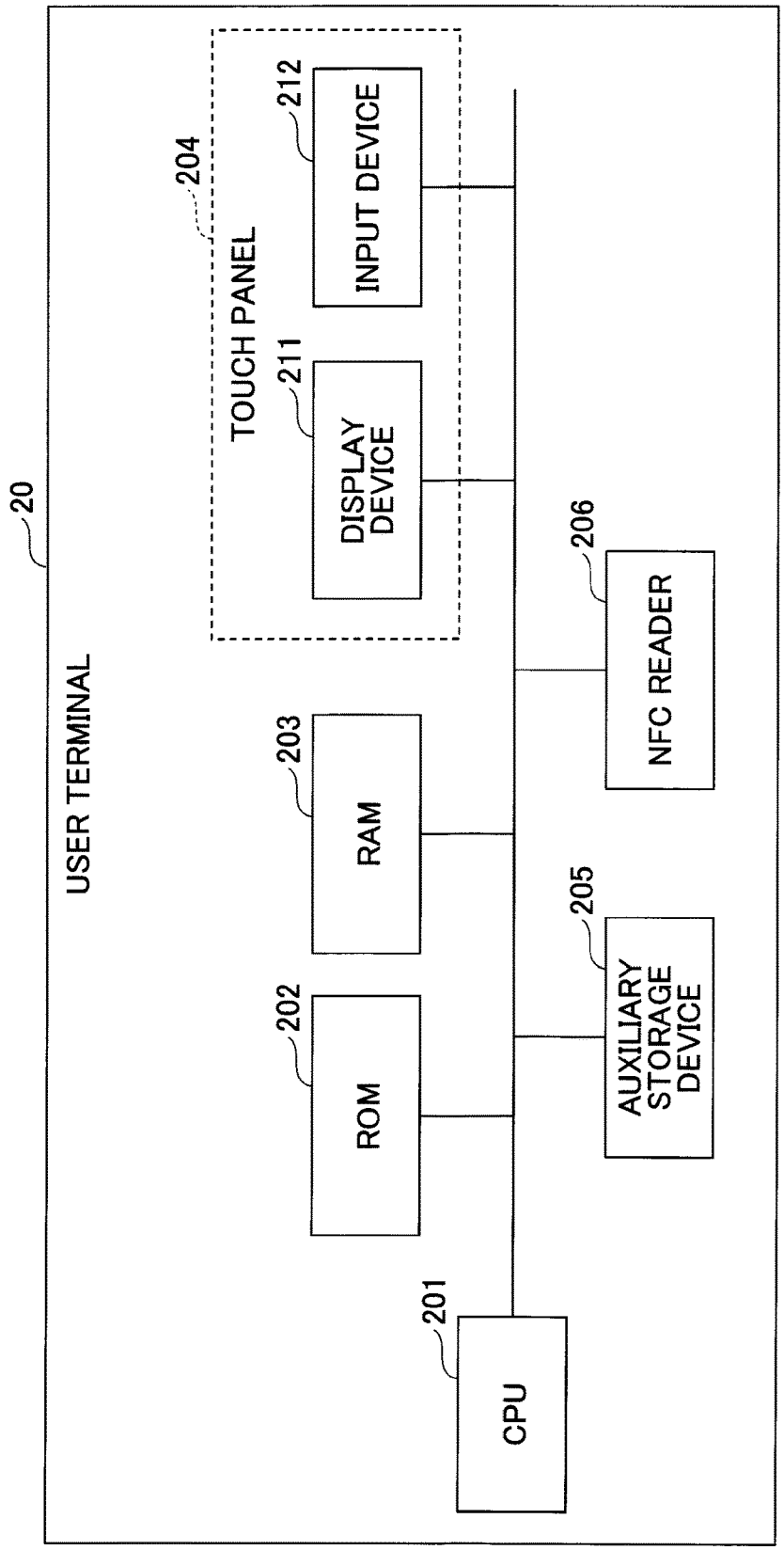

[Fig. 4]
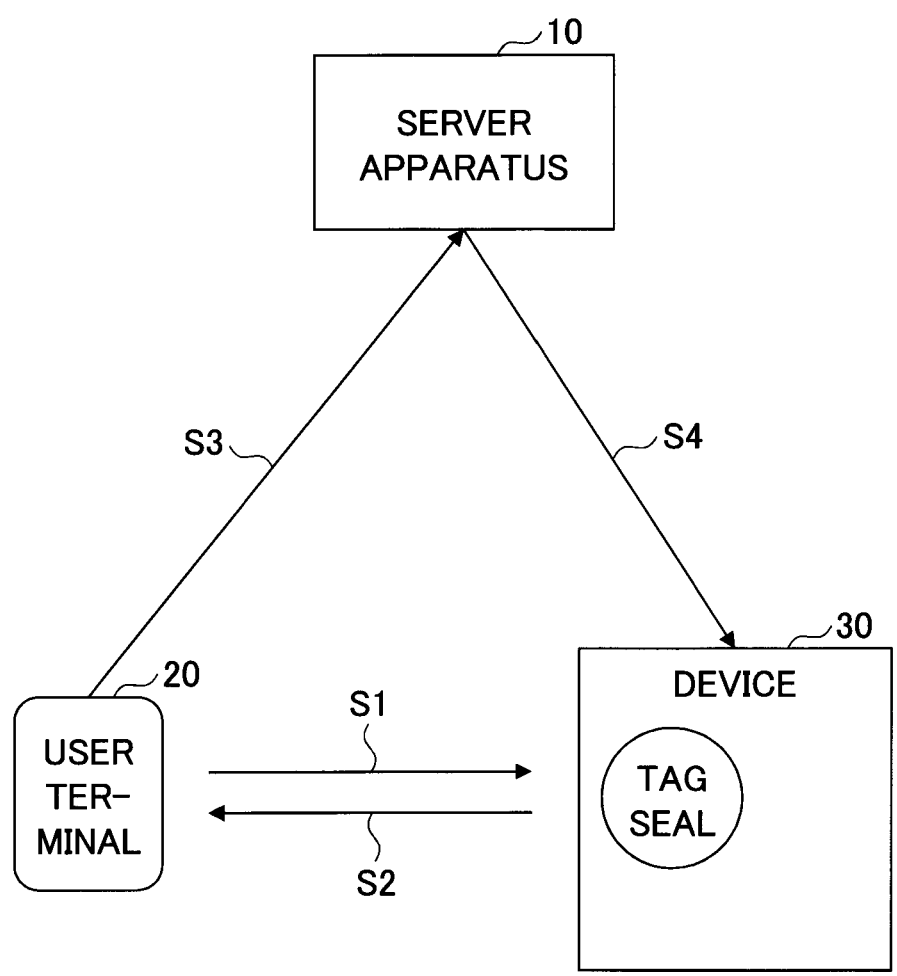

[Fig. 5]
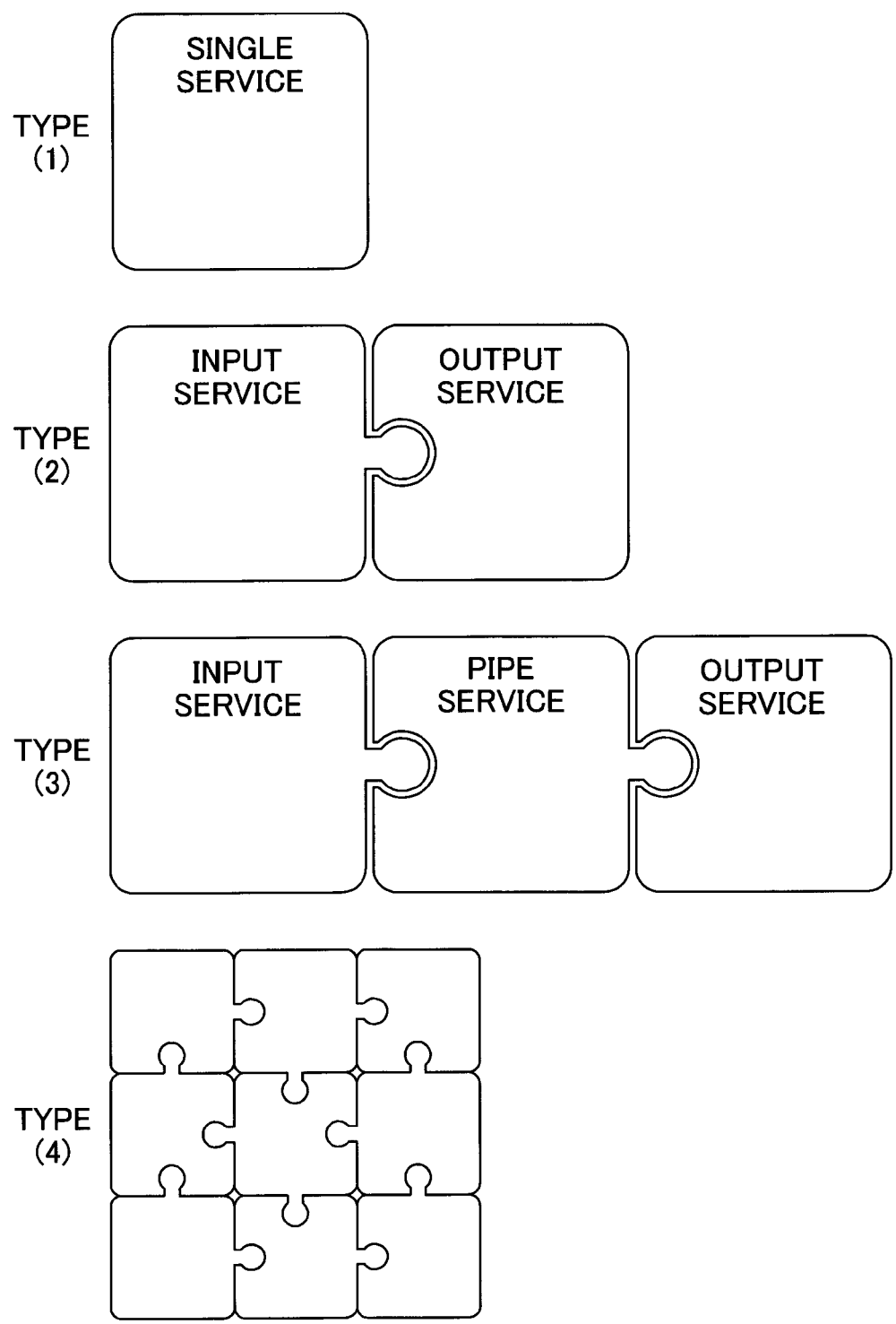

[Fig. 6]
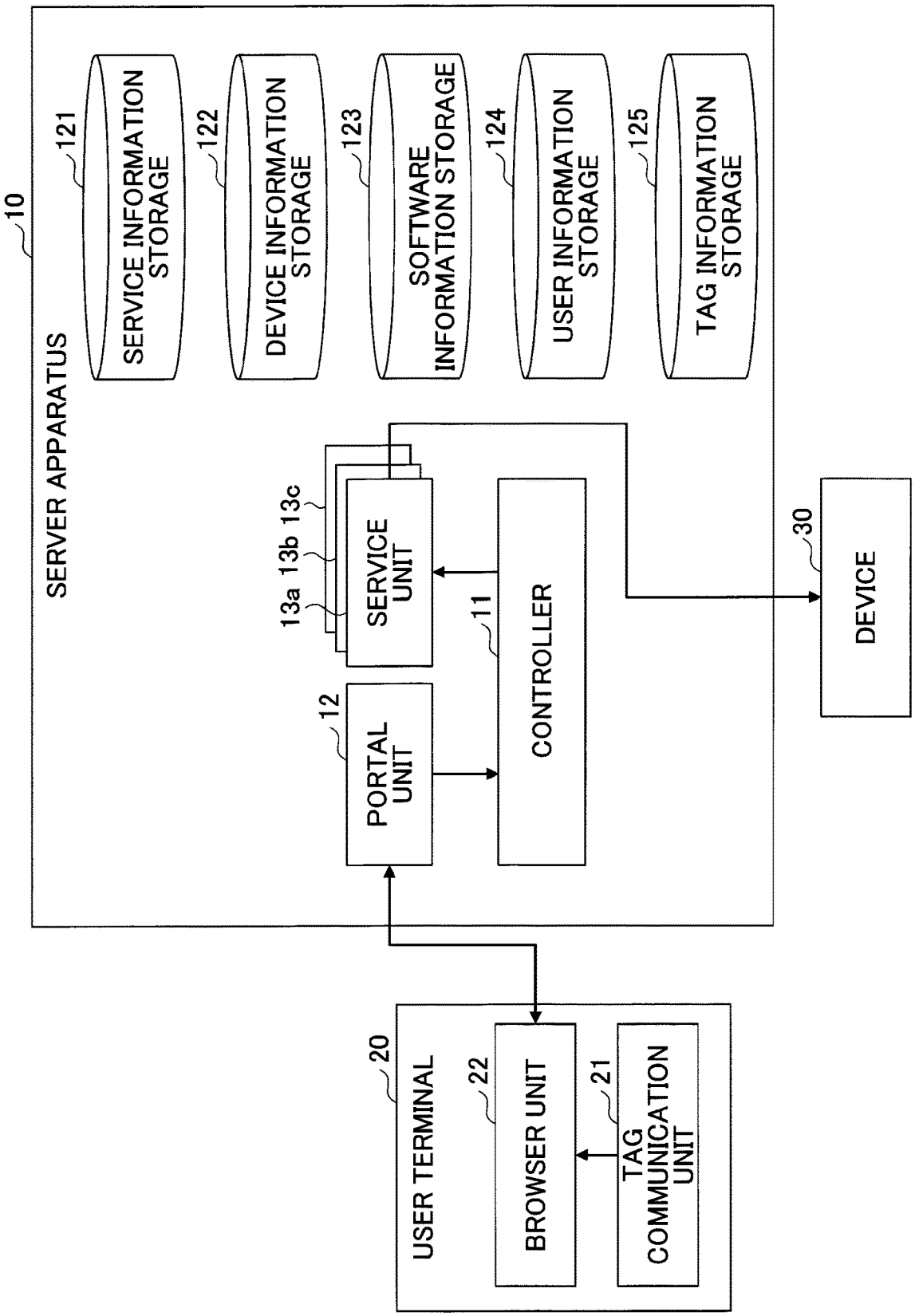

[Fig. 7]
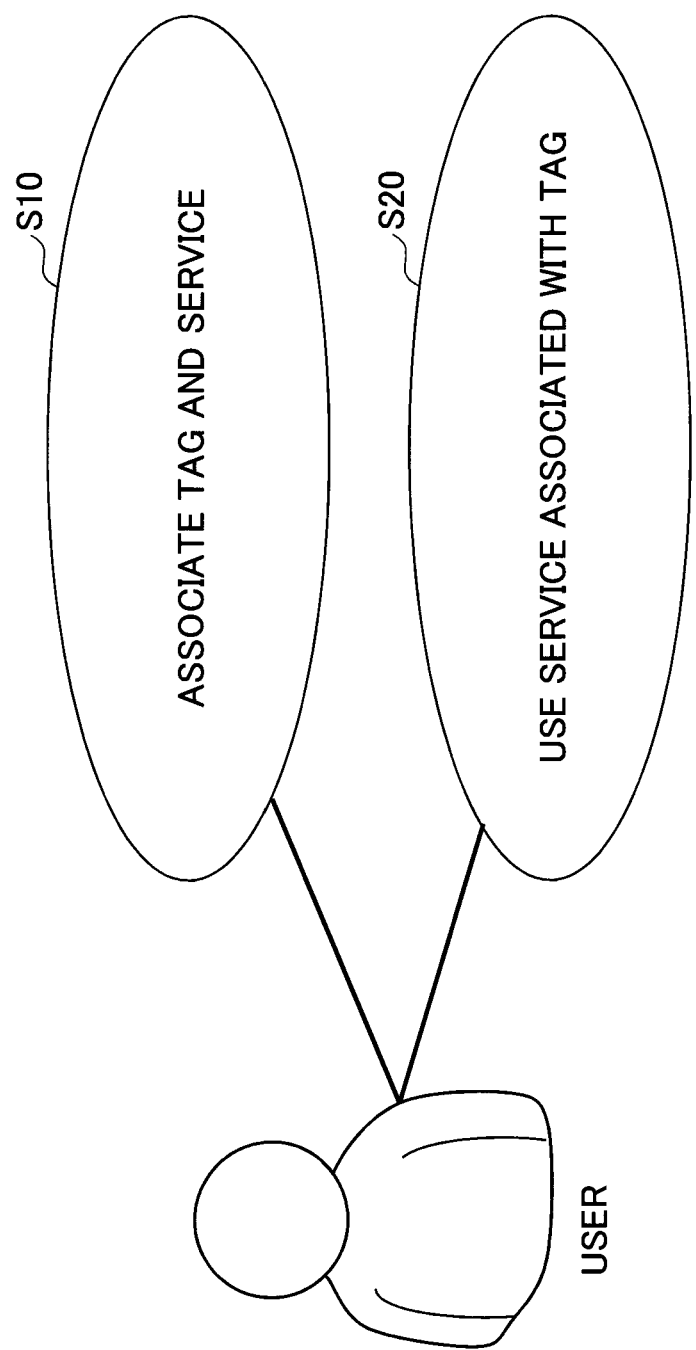

[Fig. 8]
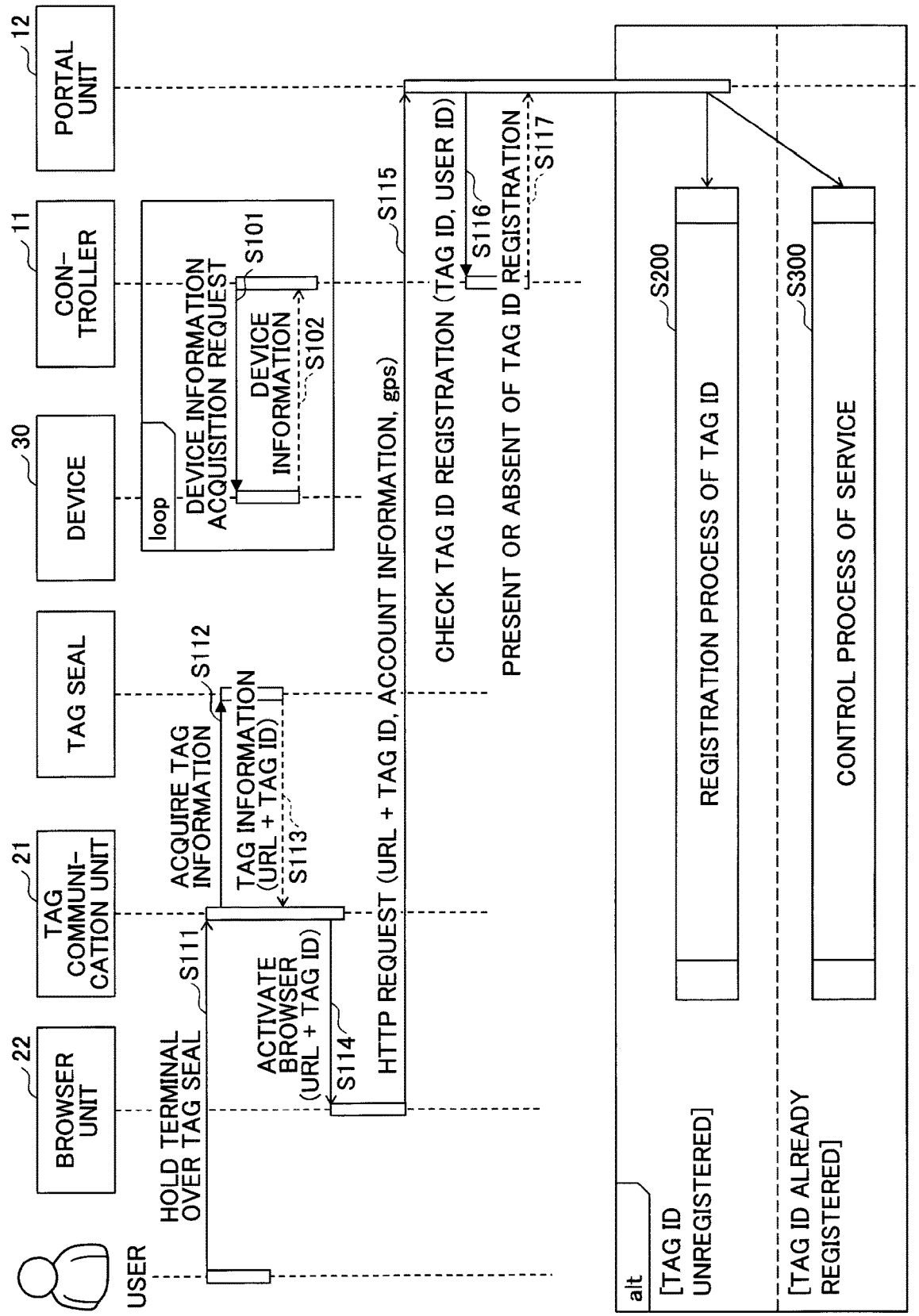

[Fig. 9]

| SUBJECT ID | IP ADDRESS | TYPE | MODEL NAME | NAME | LOCATION | DEVICE STATUS | DEVICE ACCOUNT |
|---|---|---|---|---|---|---|---|
| D_IWB1 | 10.56.0.2 | IWB | D550 | RoomA | FUKUOKA CITY, FUKUOKA | ENERGY SAVING STATUS | Root |
| D_MFP1 | 10.56.0.3 | MFP | MPC8 | ColorA4 | FUKUOKA CITY, FUKUOKA | POWER OFF STATUS | admin |
| .. | .. | .. | .. | .. | .. | .. | .. |

| USER ID | TAG ID | INPUT SERVICE | OUTPUT SERVICE |
|---|---|---|---|
| Taro | Tag01 | SS_LATEST | SD_PRINT |
|  | Tag02 | SS_LATEST | SD_DISP |
| : | : | : | : |

[Fig. 11]
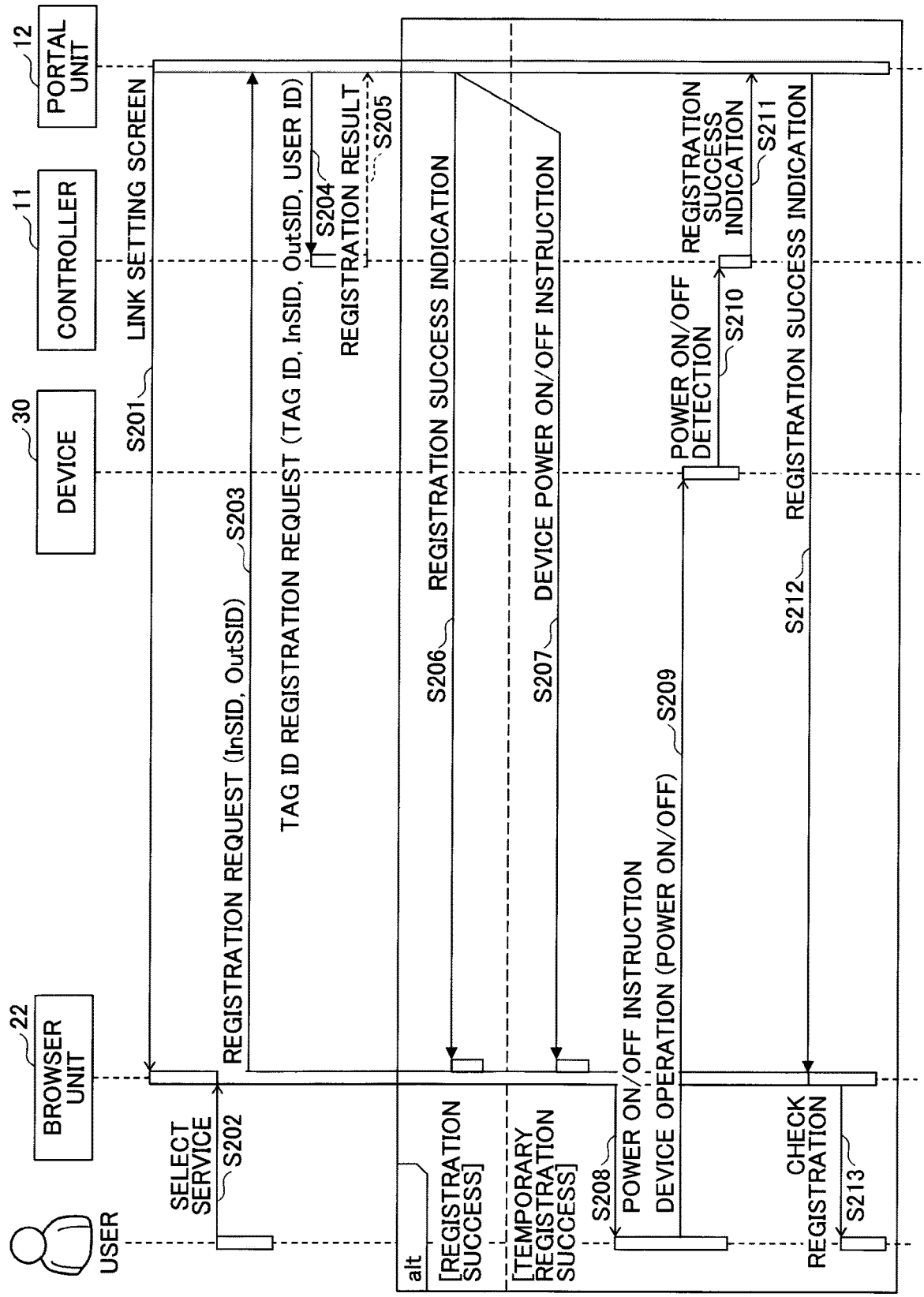

[Fig. 12]
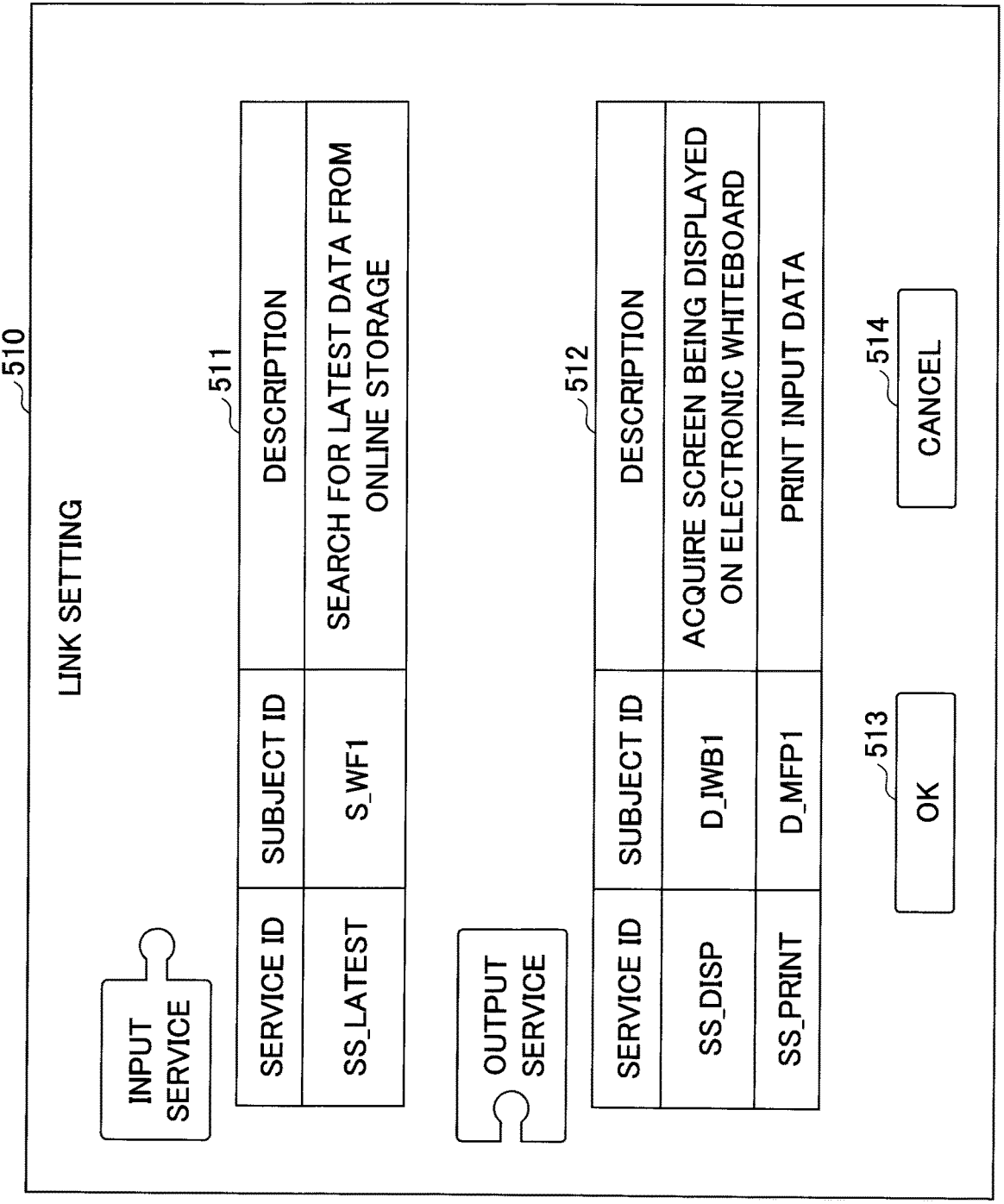

[Fig. 13]

| TENANT ID | USER ID | AVAILABLE SERVICE ID |
|---|---|---|
| T001 | Taro | SS_LATEST |
| | | SD_DISP |
| | | SD_PRINT |
| | Ueno | SS_JOBLOG |
| | : | : |
| : | : | : |

| TENANT ID | SERVICE ID | SERVICE NAME | TYPE | SUBJECT ID | DESCRIPTION |
|---|---|---|---|---|---|
| T001 | SD_CAP | INPUT OF ELECTRONIC WHITEBOARD | INPUT | D_IWB1 | INPUT SCREEN BEING DISPLAYED ON ELECTRONIC WHITEBOARD |
| | SD_RFAX | FAX RECEPTION | INPUT | D_MFP1 | INPUT FAX RECEPTION FILE OF SPECIFIED SENDER FROM MULTIFUNCTION PERIPHERAL |
| | SS_LATEST | SEARCH FOR LATEST DATA | INPUT | S_WF1 | SEARCH FOR LATEST DATA FROM ONLINE STORAGE |
| | SS_JOBLOG | ACQUISITION OF PREVIOUS DATA | INPUT | S_WF2 | ACQUIRE DATA OF PREVIOUSLY USED SERVICES |
| | SD_DISP | DISPLAY OF ELECTRONIC WHITEBOARD | OUTPUT | D_IWB1 | DISPLAY INPUT DATA ON ELECTRONIC BLACKBOARD |
| | SD_PRINT | PRINTING | OUTPUT | D_MFP1 | PRINT INPUT DATA |
| | .. | | .. | .. | .. |
| .. | | | | | |

| SUBJECT ID | URL | TYPE | USER ACCOUNT |
|---|---|---|---|
| S_WF1 | rrr.com/latest | Storage | Taro |
| S_WF2 | rrr.com/joblog | DB | Taro |
| : | : | : | : |

123

[Fig. 16]
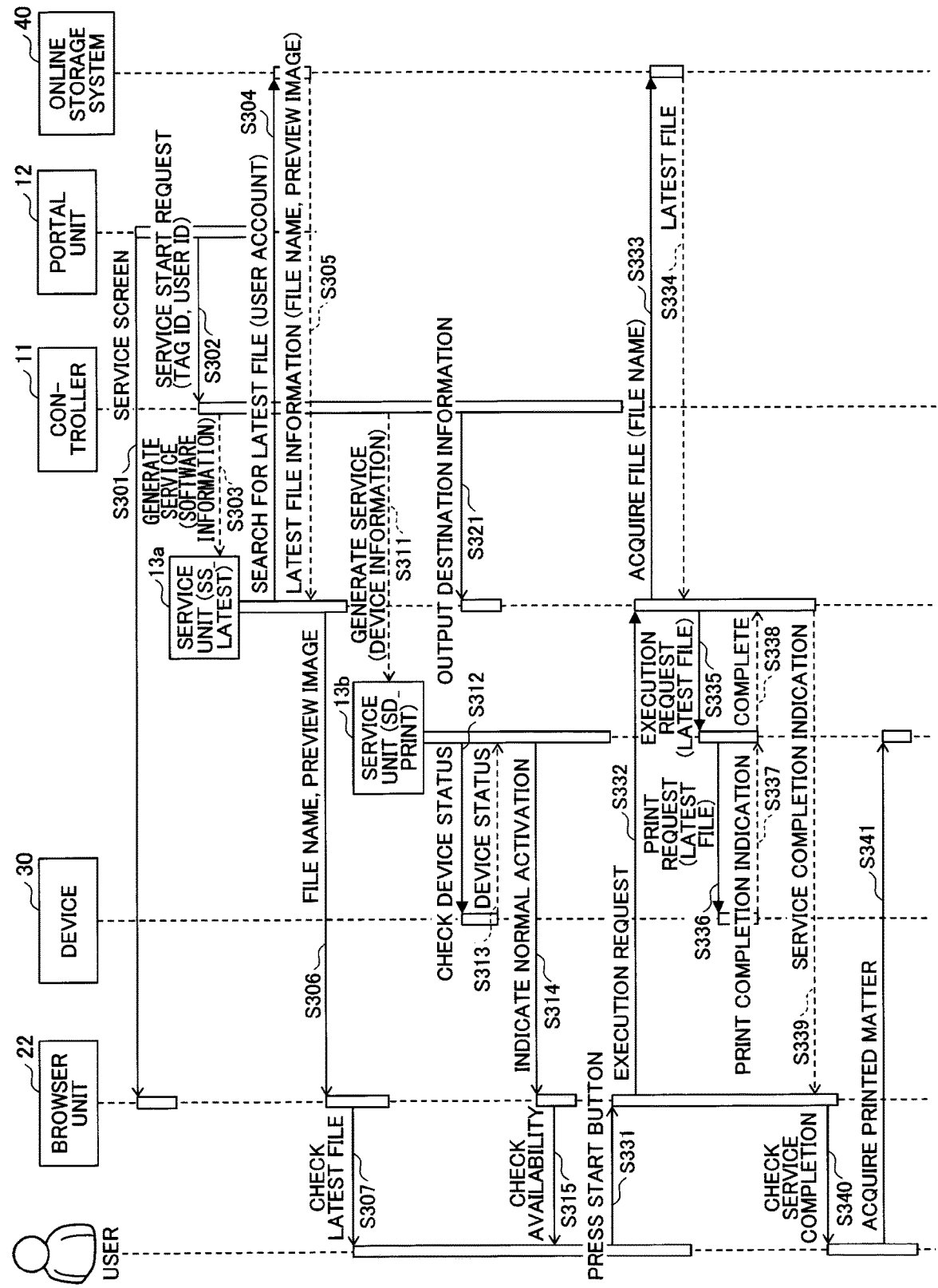

[Fig. 17]
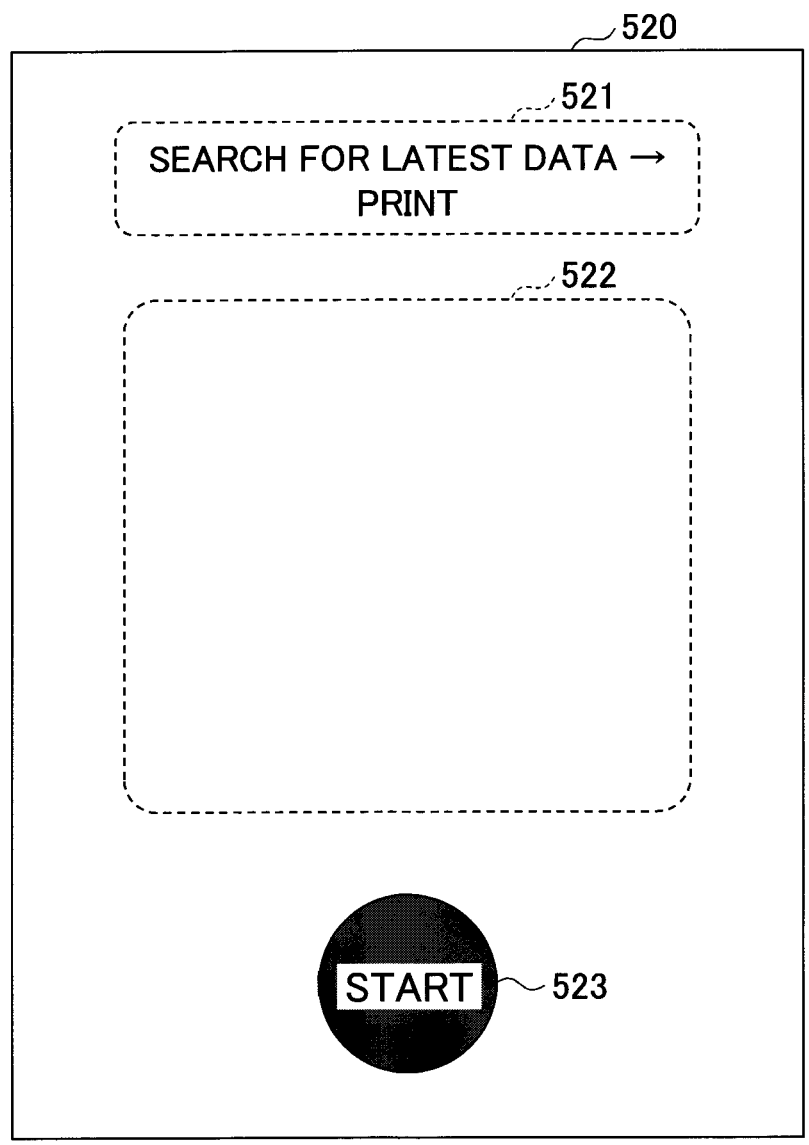

[Fig. 18]
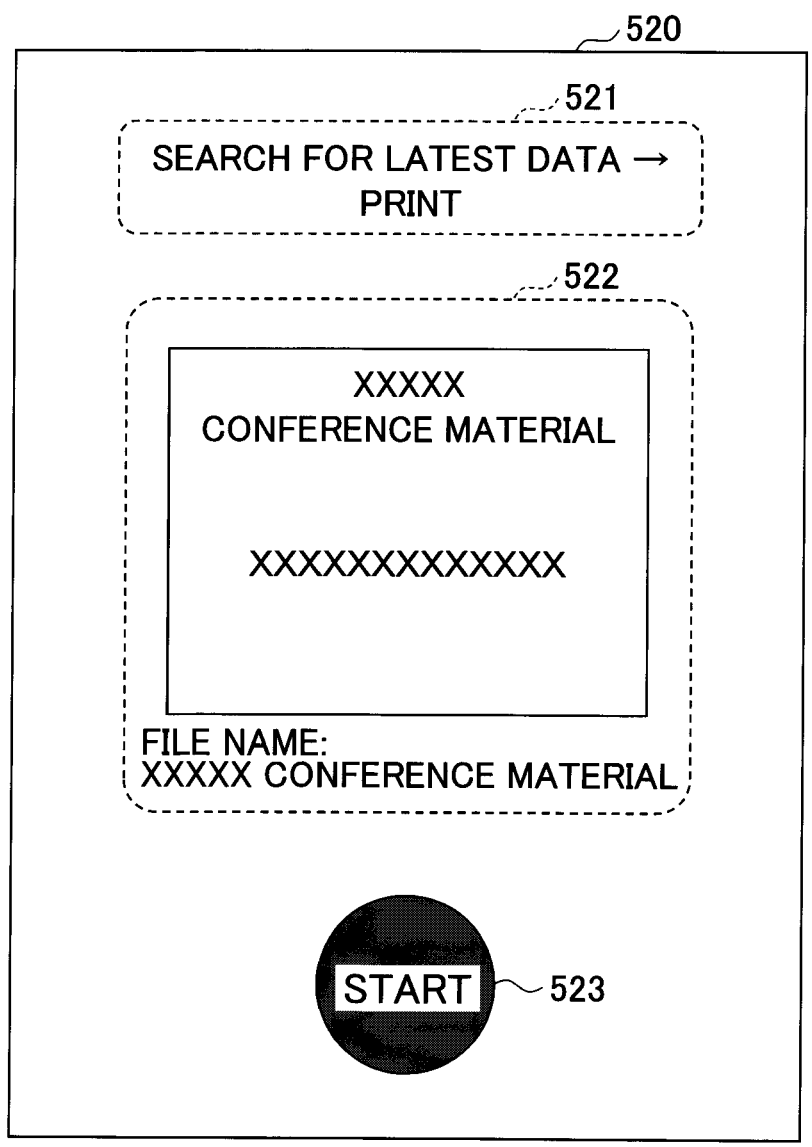

[Fig. 19]
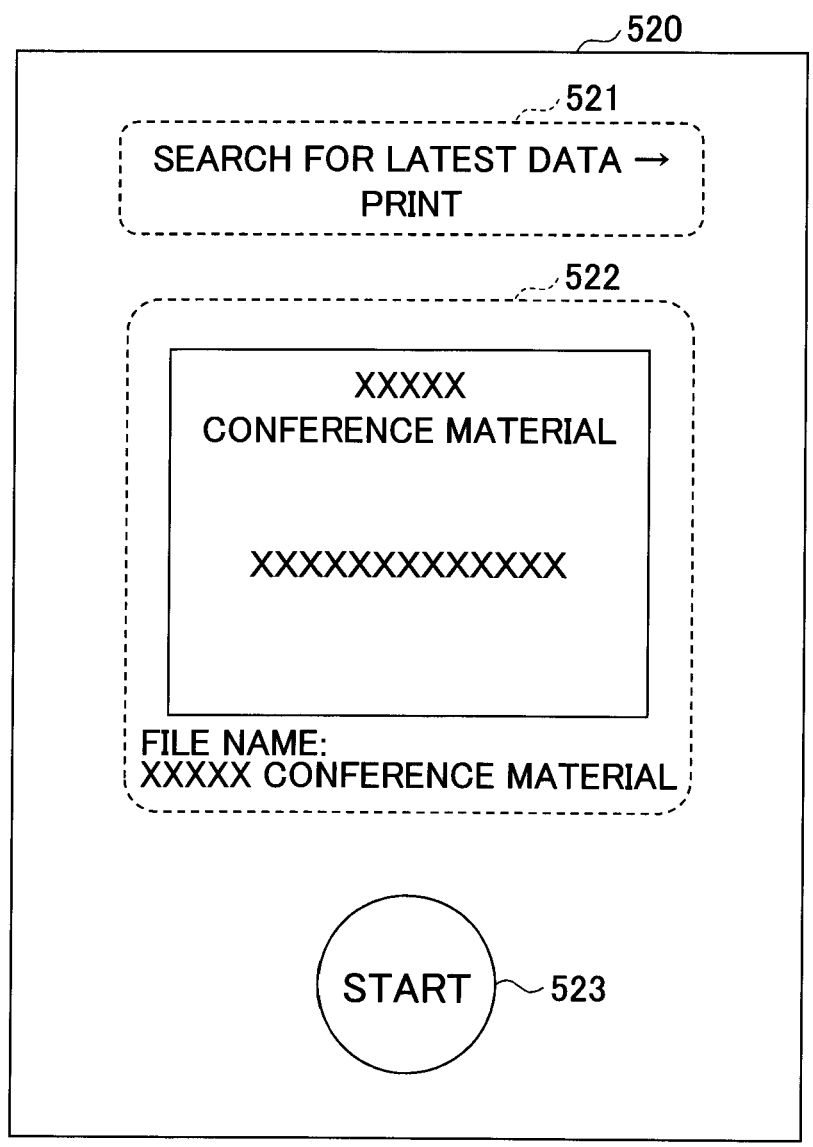

[Fig. 20]
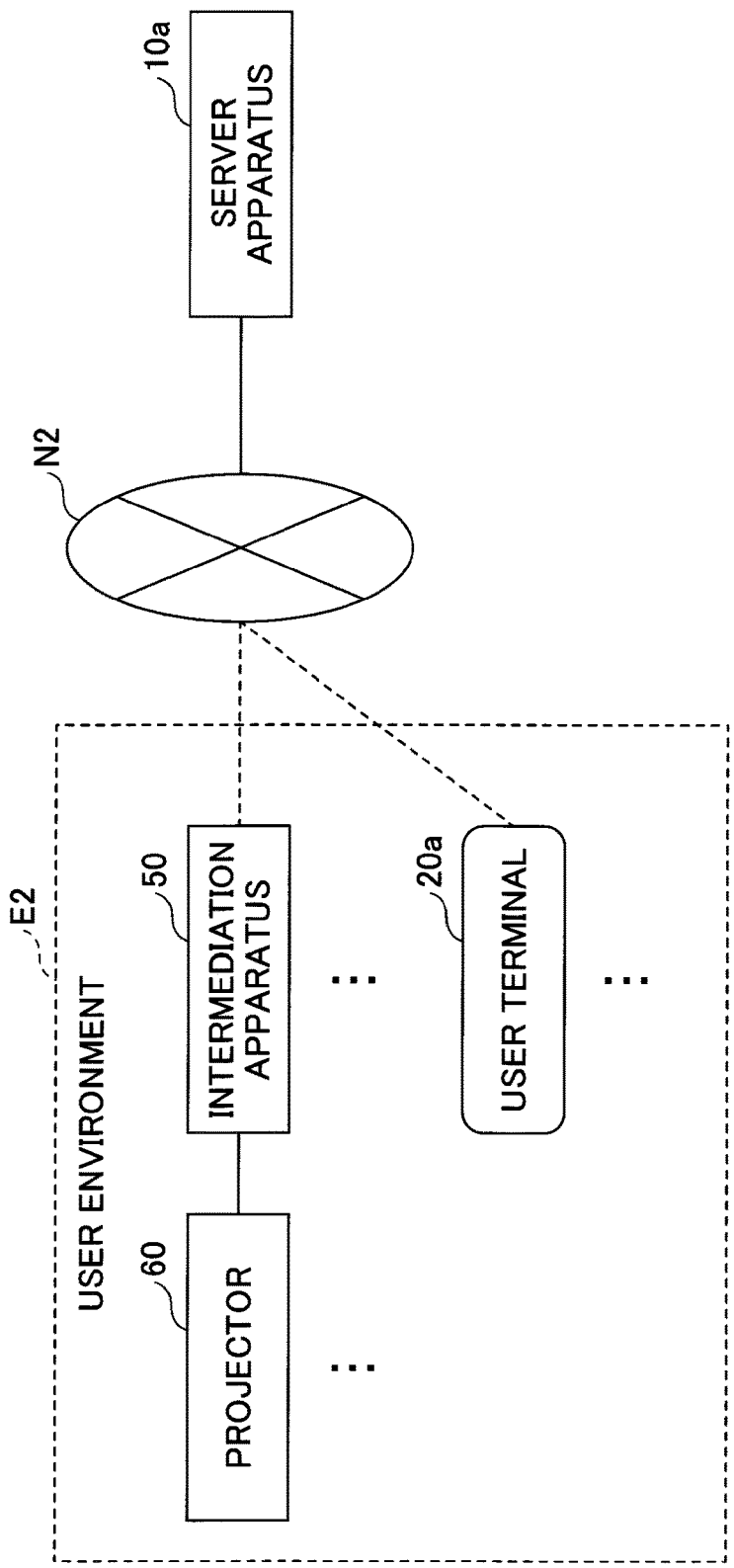

[Fig. 21]
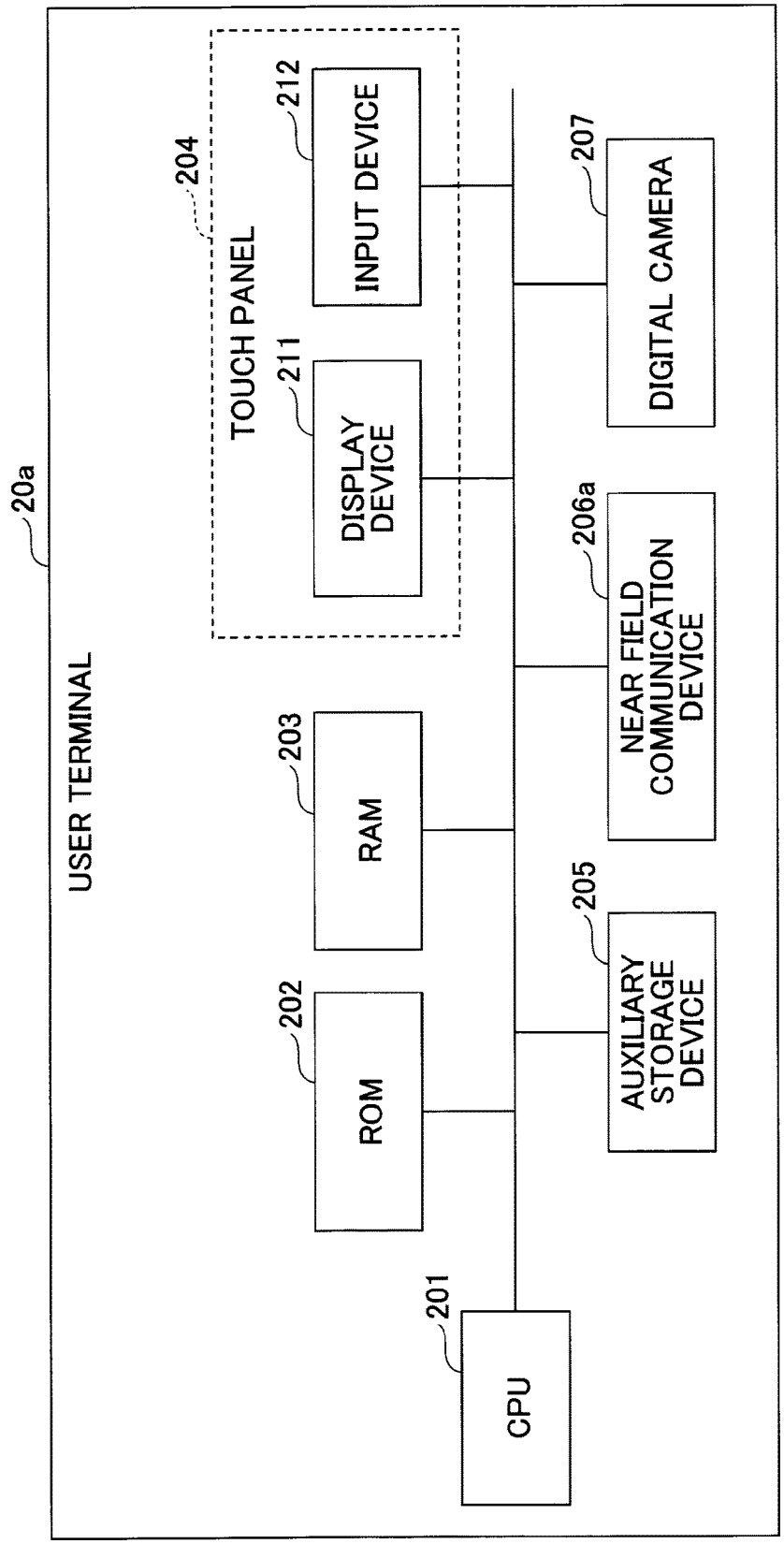

[Fig. 22]
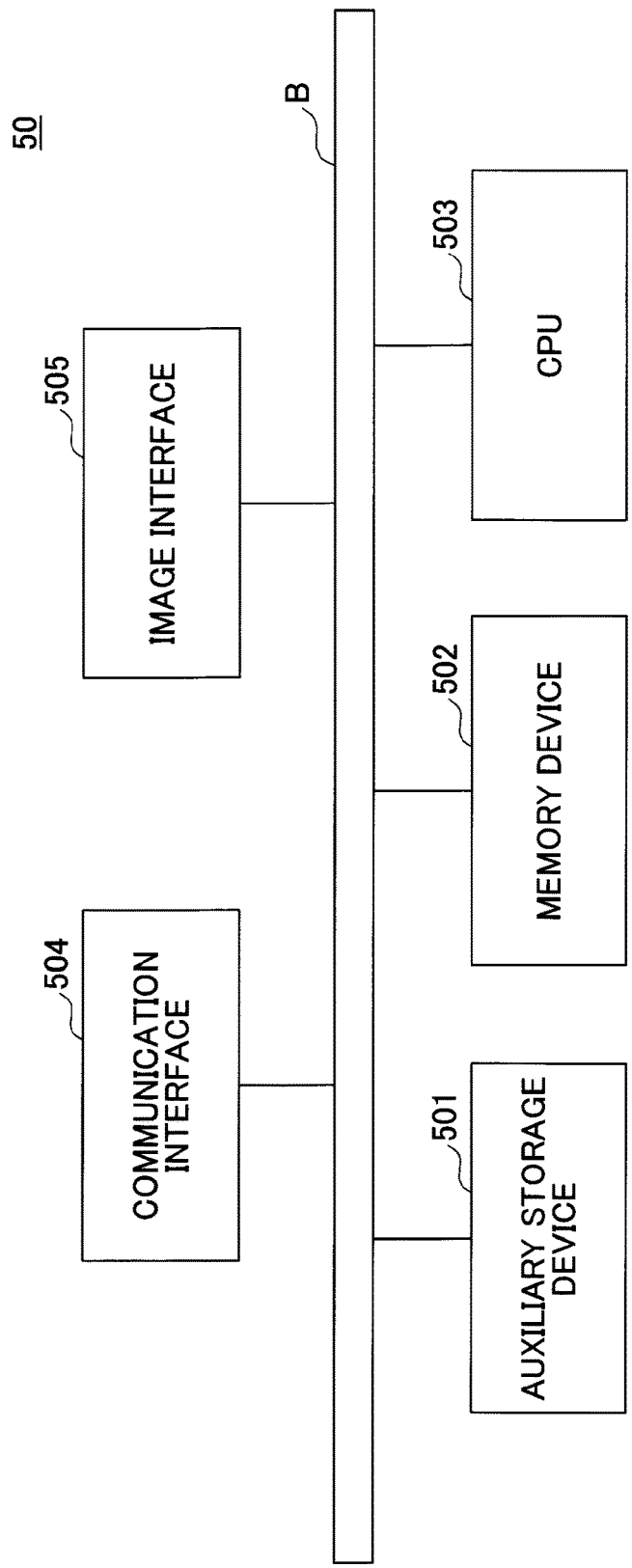

[Fig. 23]
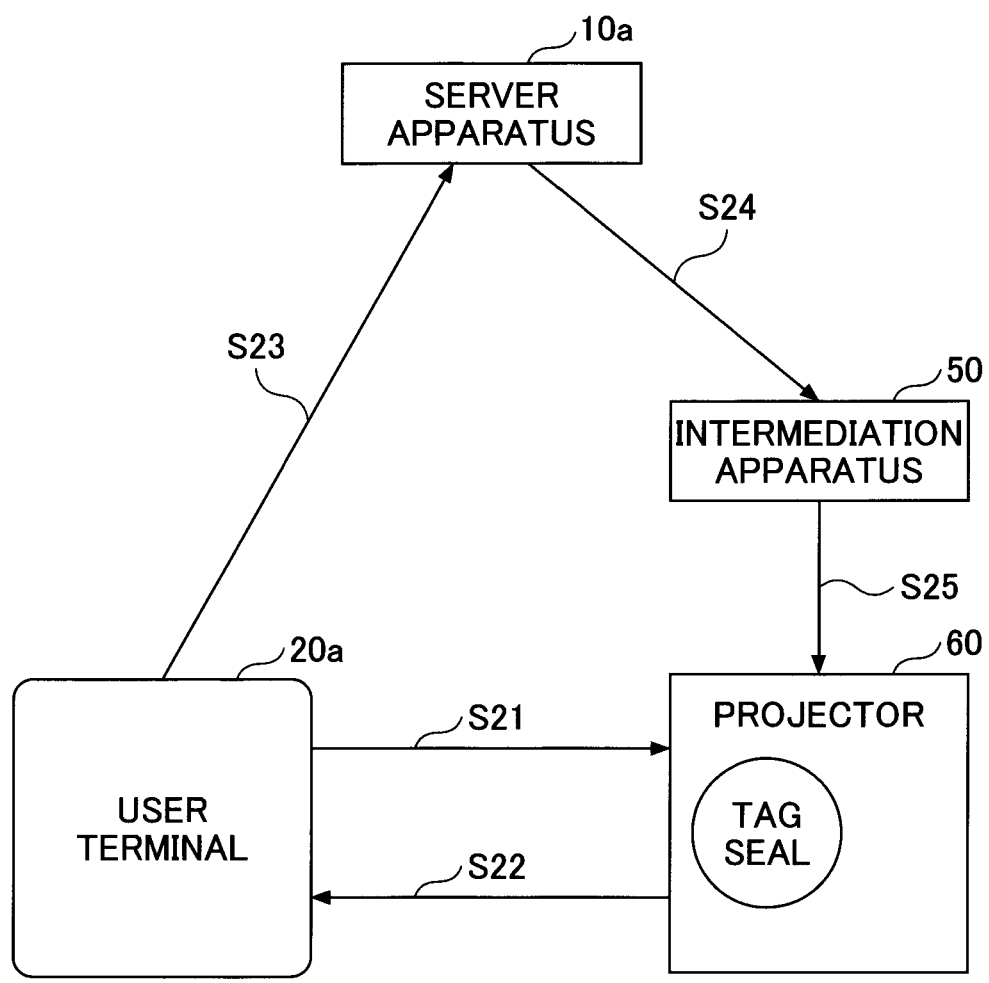

[Fig. 24]
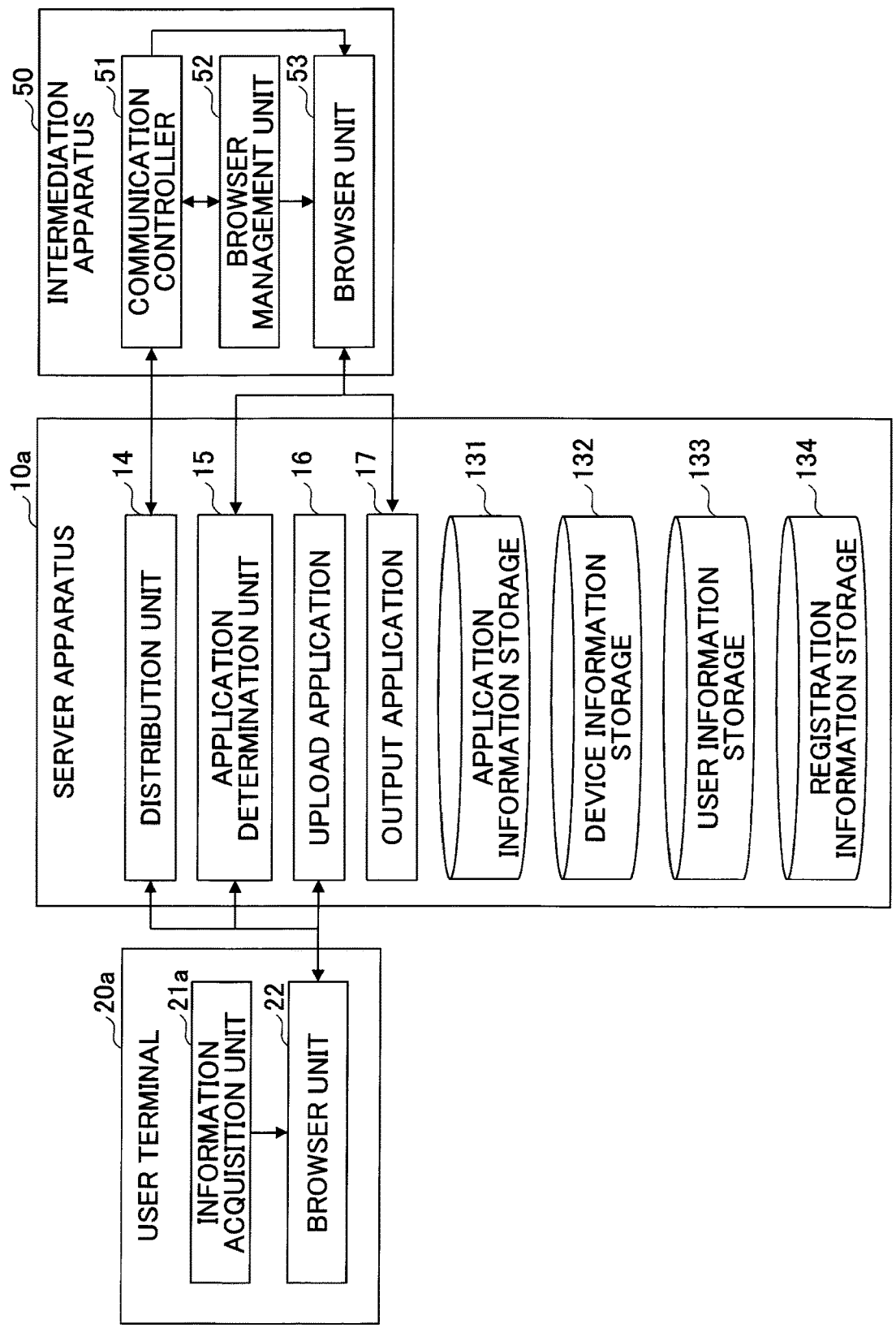

[Fig. 25]
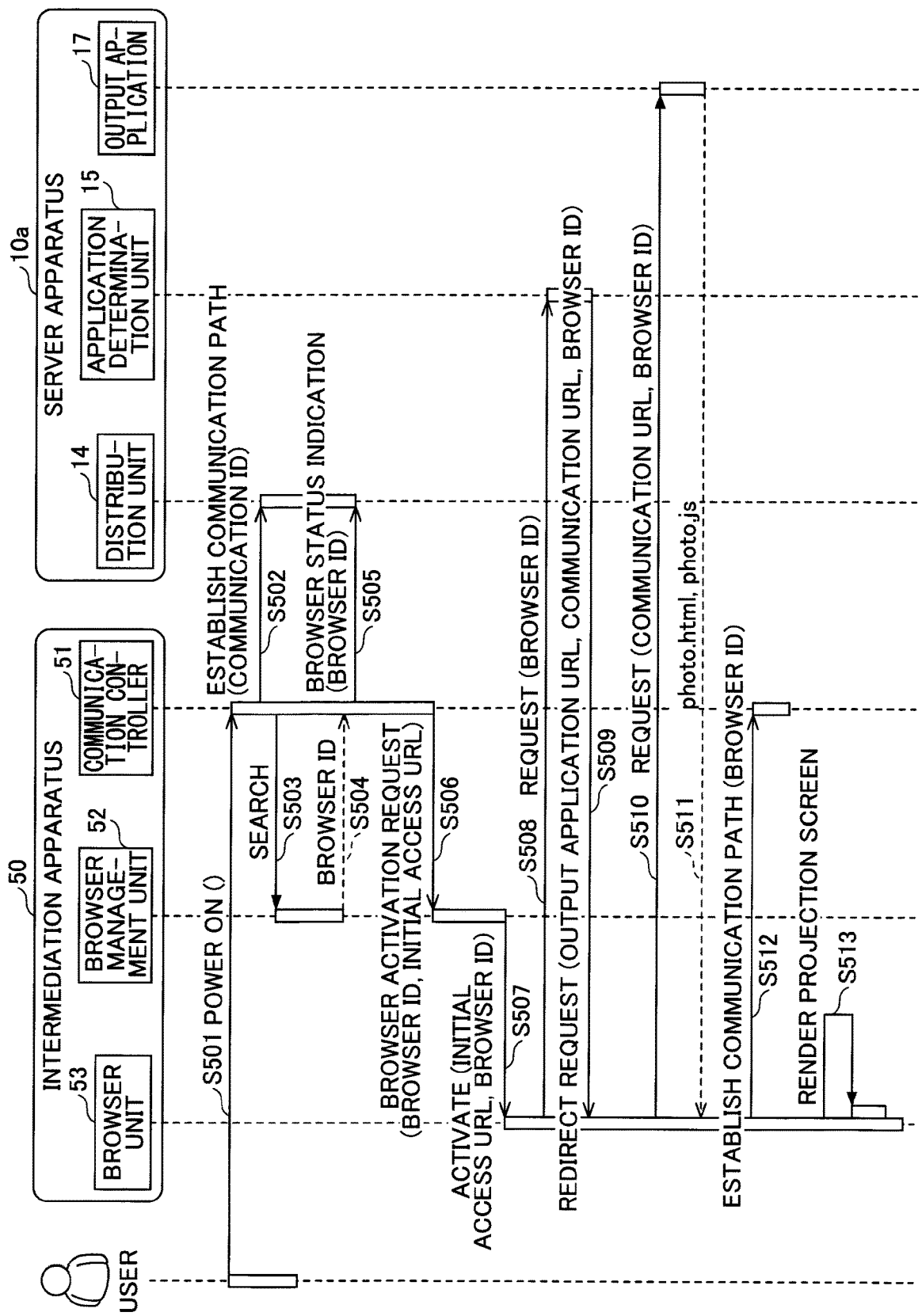

[Fig. 26]

| TENANT ID | COMMUNICATION ID | ADDRESS INFORMATION | STATUS INFORMATION | BROWSER ID | BROWSER STATUS |
|---|---|---|---|---|---|
| T001 | Eg001-01 | 10.56.60.xx | CURRENTLY CONNECTED | BROWSER1 | POWER OFF |
|  | Eg001-02 | 192.168.0.xx | UNCONNECTED | BROWSER2 | POWER OFF |
|  | .. | .. | .. | .. | .. |
| .. |  |  |  |  |  |

| REGISTRATION ID | In APPLICATION ID | Out APPLICATION ID | BROWSER ID |
|---|---|---|---|
| Tag01 | AP_Upload | AP_PhotoShow | BROWSER1 |
| : | : | : | : |

| APPLICATION ID | APPLICATION TYPE | URL |
|---|---|---|
| AP_PhotoShow | Out | https://daas.com/photoshow |
| AP_Upload | In | https://daas.com/upload |

131

[Fig. 29]
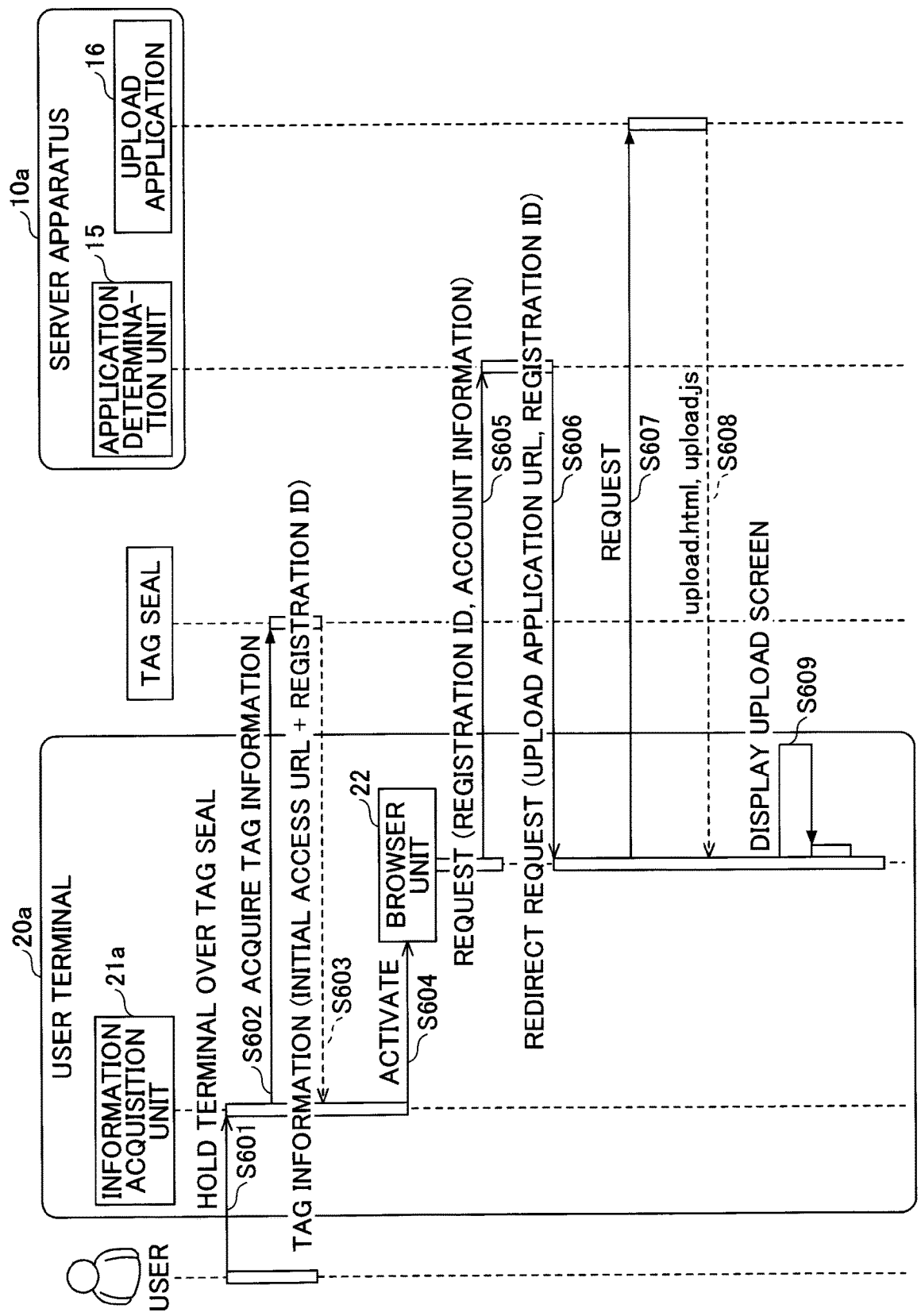

[Fig. 30]

| TENANT ID | USER ID | ... 133 |
|---|---|---|
| T001 | gest | ... |
| | taro | ... |
| | ... | ... |
| : | : | : |

[Fig. 31]
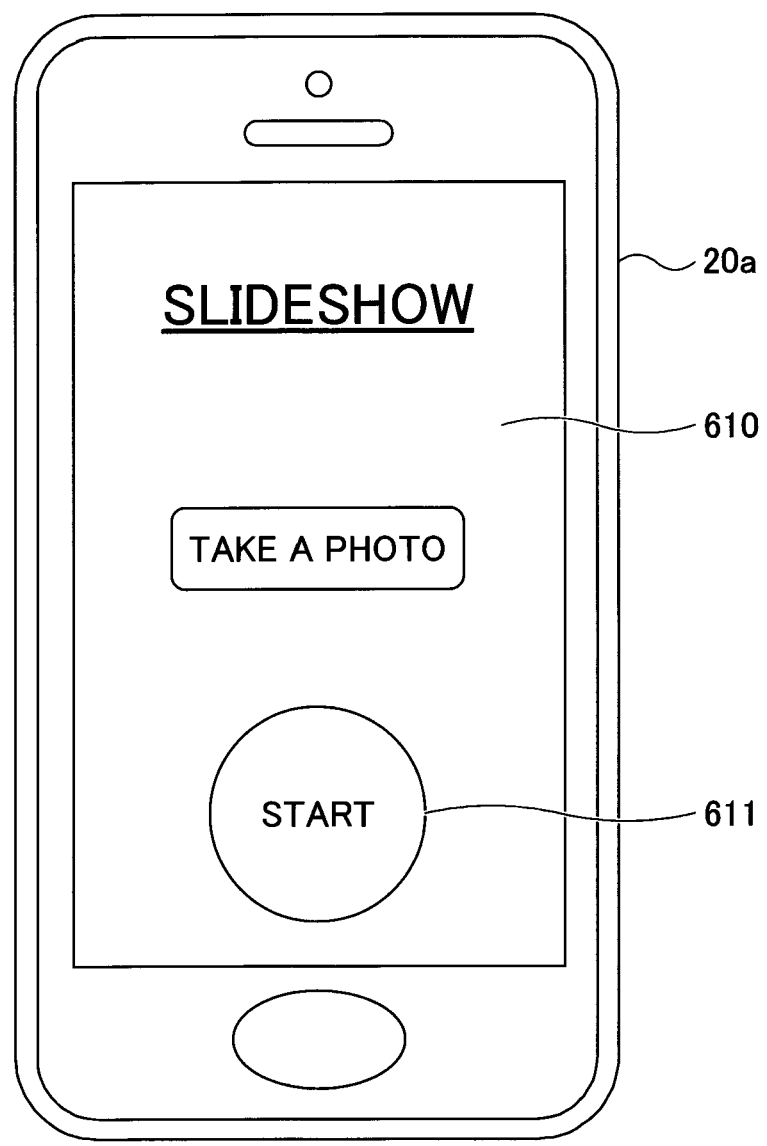

[Fig. 32]
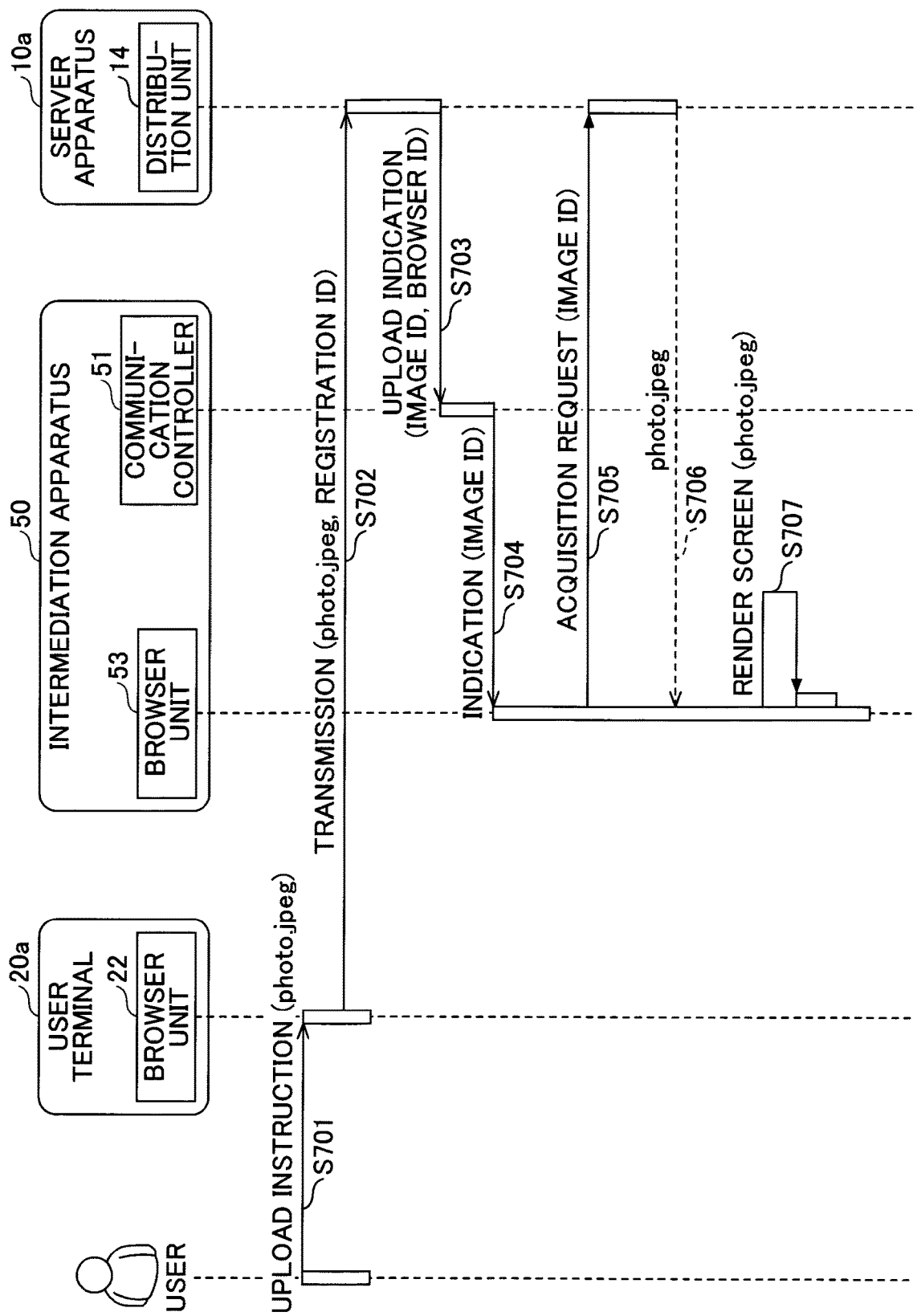

[Fig. 33]
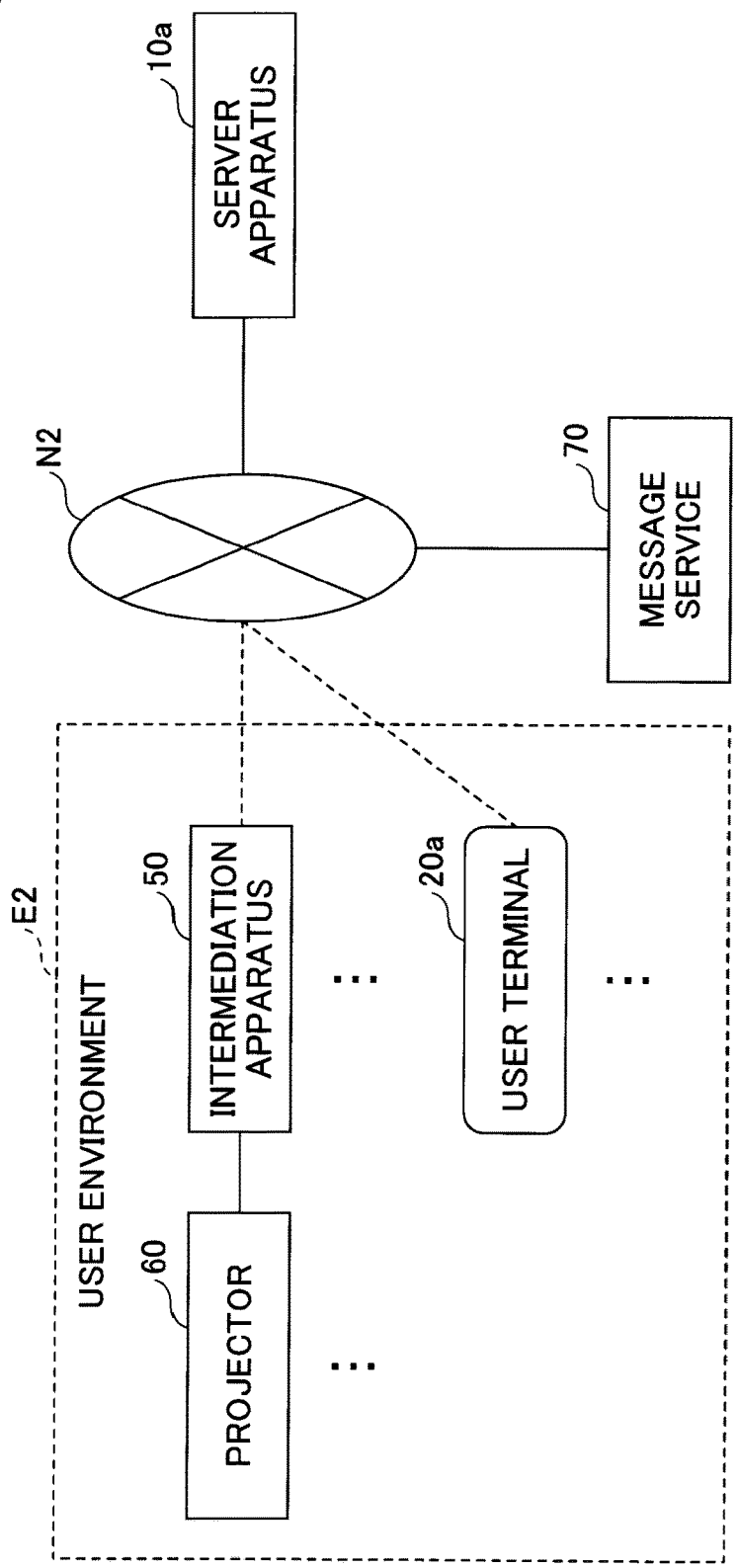

[Fig. 34]
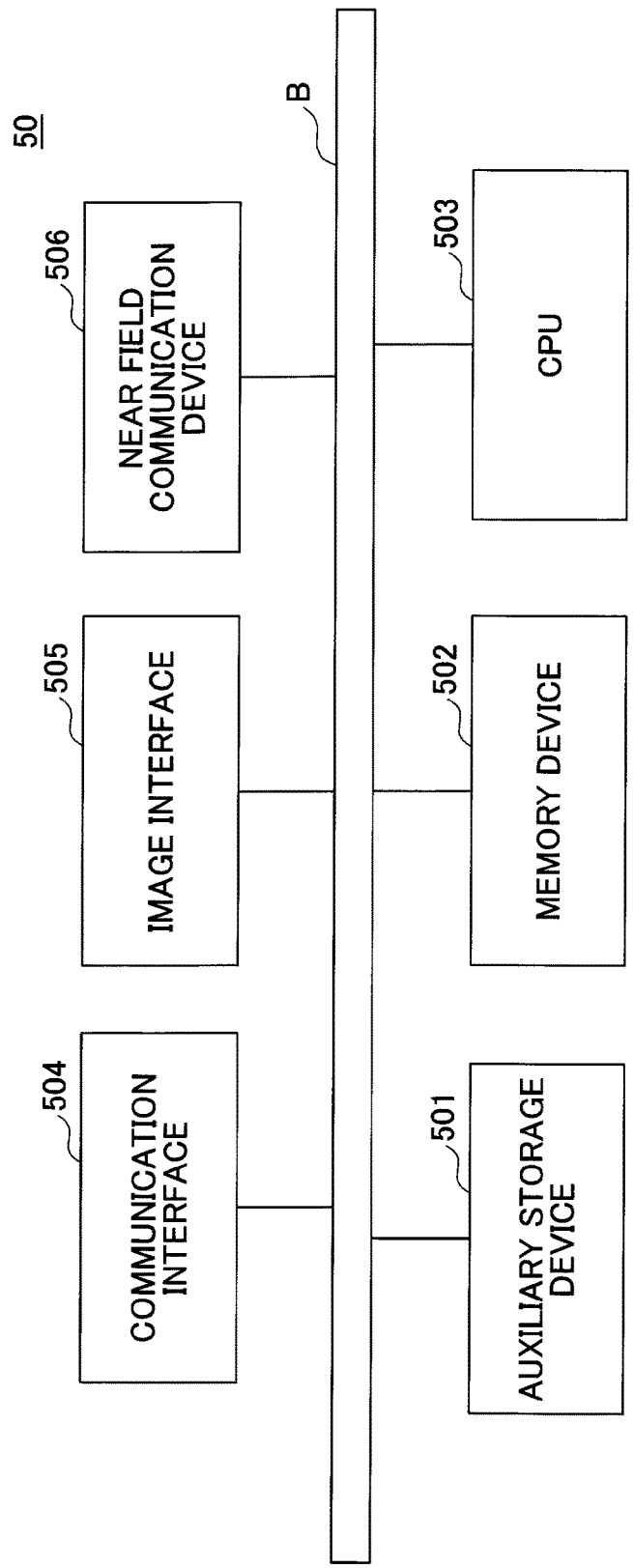

[Fig. 35]
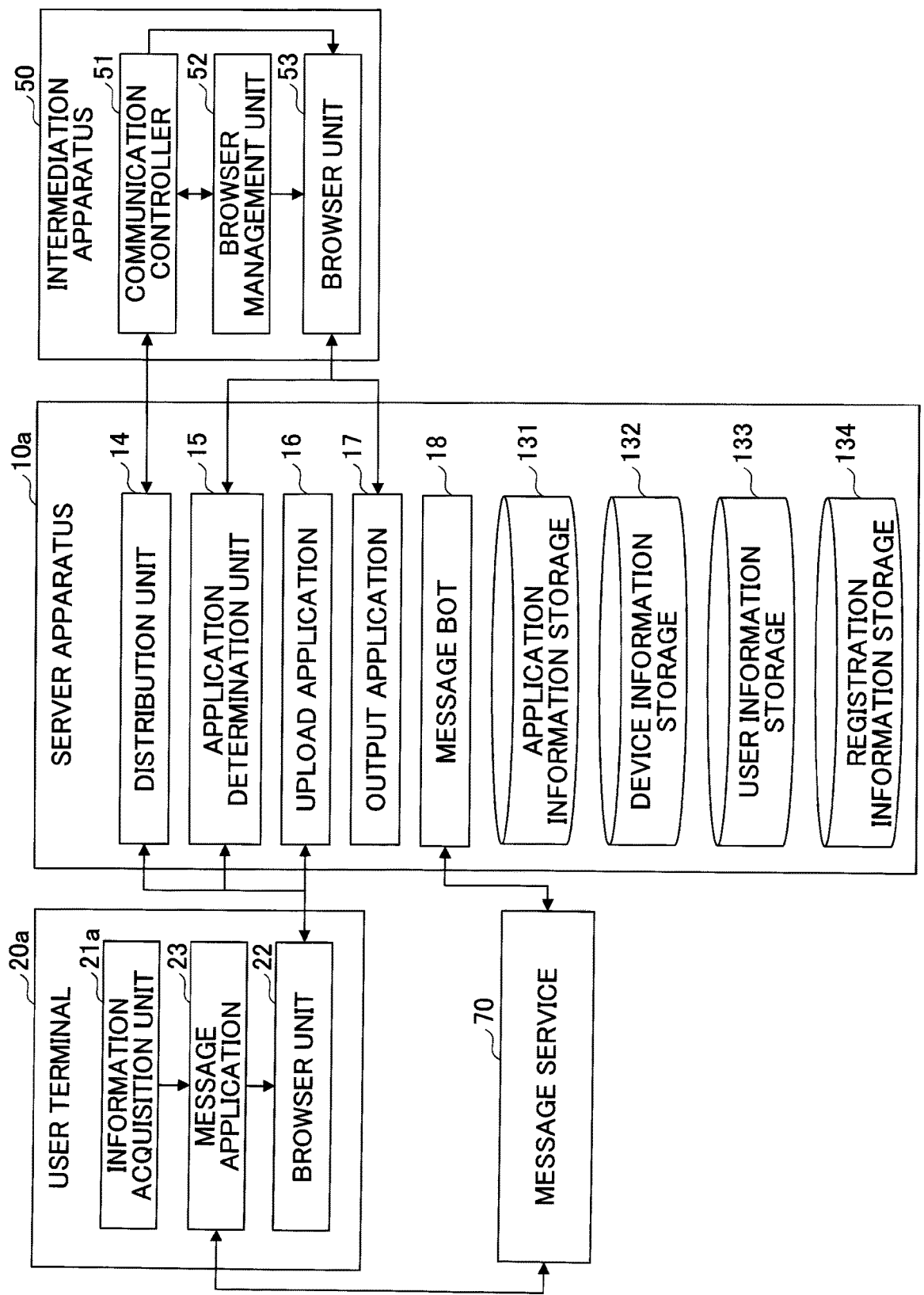

[Fig. 36]
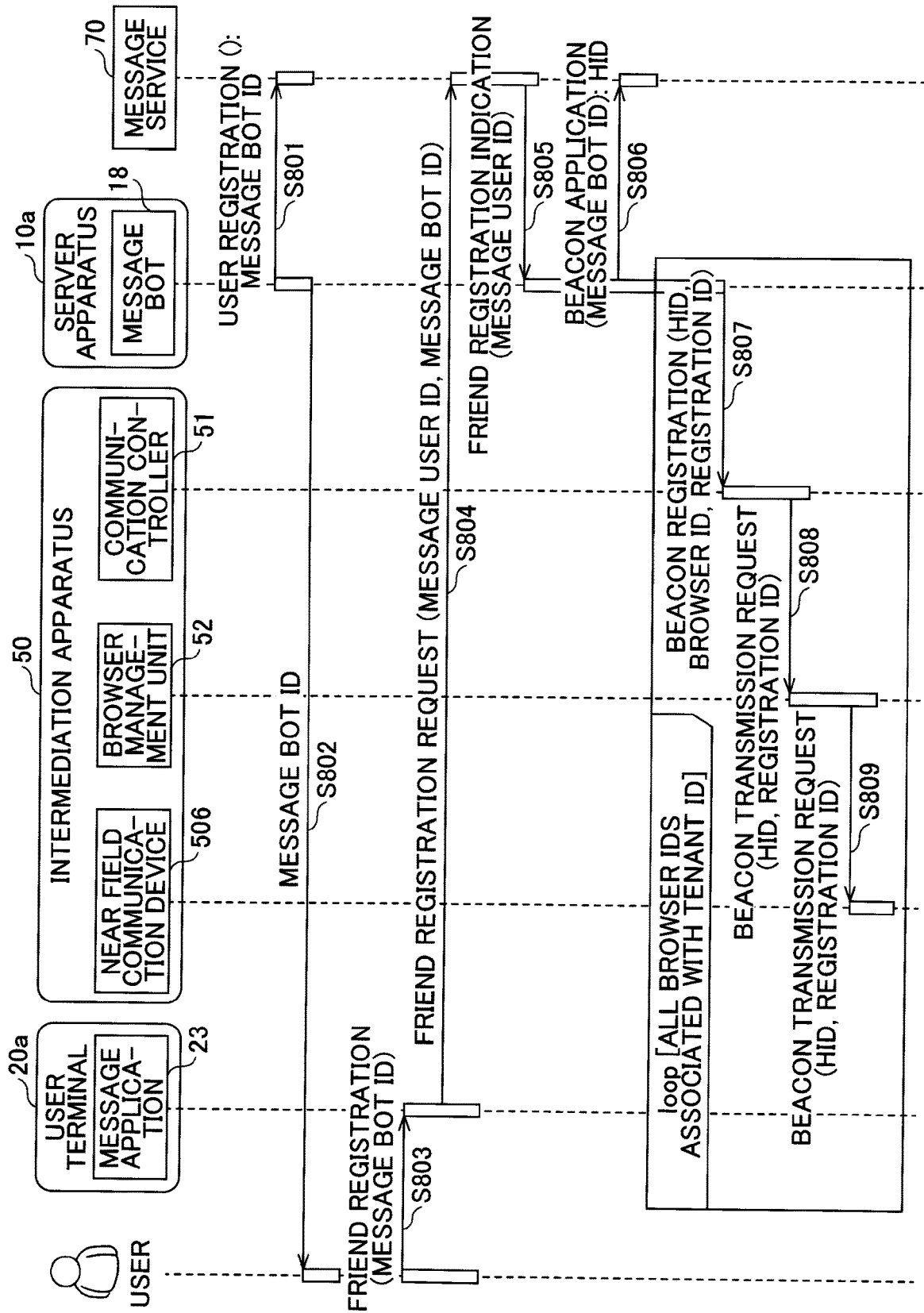

[Fig. 37]

| TENANT ID | USER ID | MESSAGE USER ID | ... |
|---|---|---|---|
| T001 | guest | ... | ... |
| | taro | ... | ... |
| | ... | ... | ... |
| : | : | : | : |

133

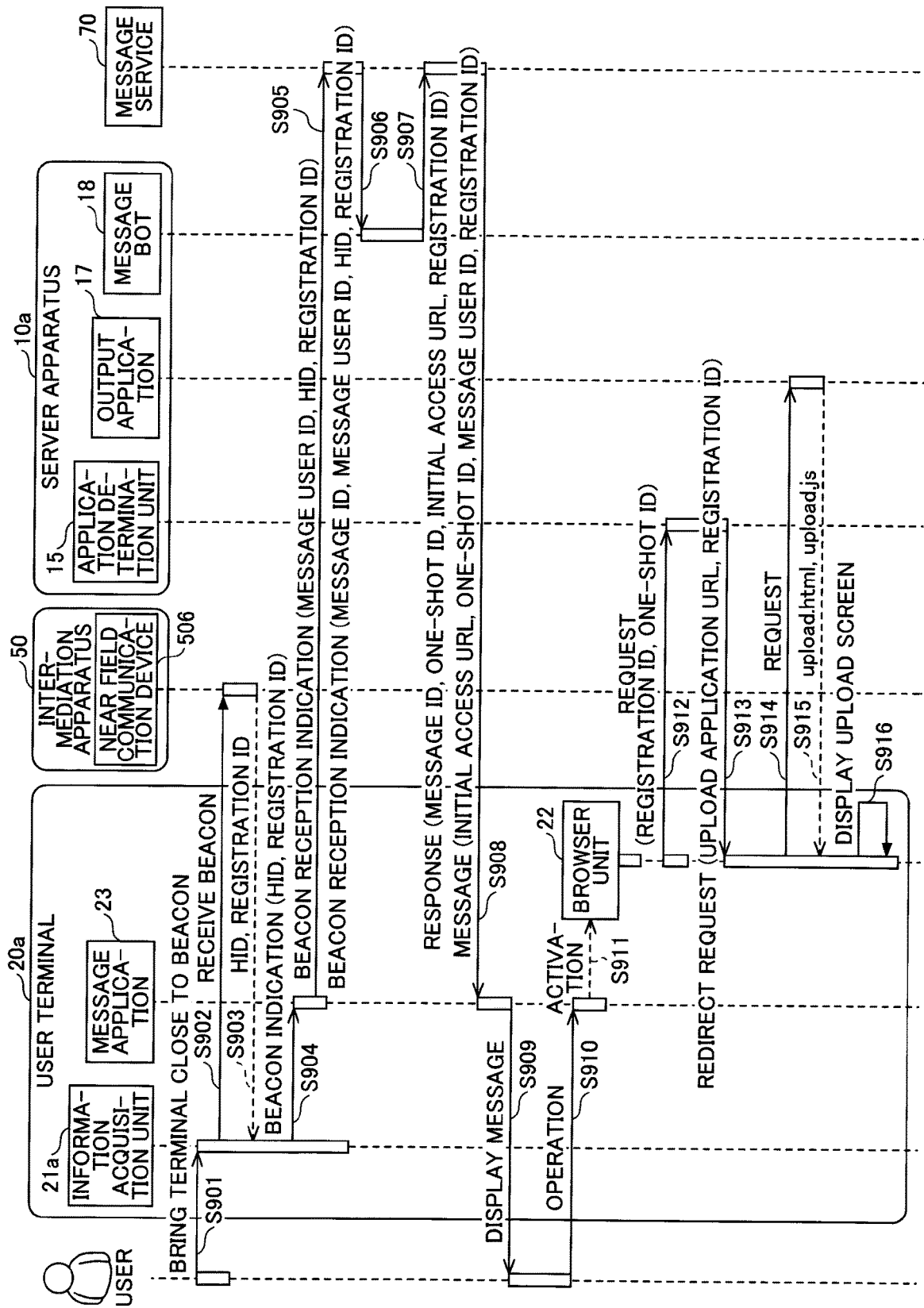
[Fig. 38]

INFORMATION PROCESSING SYSTEM, INFORMATION PROCESSING APPARATUS, INFORMATION PROCESSING METHOD, AND MEDIUM FOR CONTROLLING DEVICE BASED ON DEVICE AND USER IDENTIFICATION INFORMATION

TECHNICAL FIELD

The disclosures discussed herein relate to an information processing system, an information processing apparatus, an information processing method, and a nontransitory computer-readable medium.

BACKGROUND ART

In an office, various devices are utilized for carrying out business operations. Utilization of various types of devices leads to expectations such as improving work efficiency and reducing operational errors.

CITATION LIST

Patent Literature

[PTL 1] Japanese Unexamined Patent Publication No. 2013-77279

SUMMARY OF INVENTION

Technical Problem

However, such devices of various types often need to have complicated operations due to sophistication of functions and the like, which result in an increase in a period necessary for mastering these device operations. Further, another factor for increasing a learning period of device operations may be user interfaces which differ depending on types of devices.

Solution to Problem

In view of the above-described problems, one aspect of the present invention is directed to providing an information processing system, which includes a terminal and an information processing apparatus. The terminal includes an acquisition unit configured to acquire first identification information from outside, and a transmitter configured to transmit the first identification information and second identification information for identifying a user of the terminal to the information processing apparatus. The information processing apparatus includes a receiver configured to receive the first identification information and the second identification information, and a controller configured to cause a device associated with a combination of the first identification information and the second identification information received by the receiver to execute a process.

Advantageous Effects of Invention

It is possible to provide new operability with respect to a device.

BRIEF DESCRIPTION OF DRAWINGS

FIG. 1 is a diagram illustrating a configuration example of an information processing system according to a first embodiment;

FIG. 2 is a diagram illustrating a hardware configuration example of a server apparatus 10 according to the first embodiment;

FIG. 3 is a diagram illustrating a hardware configuration example of a user terminal 20 according to the first embodiment;

FIG. 4 is a diagram illustrating an outline of the first embodiment;

FIG. 5 is a diagram illustrating examples of types of services;

FIG. 6 is a diagram illustrating functional configuration examples of a user terminal 20 and a server apparatus 10 according to the first embodiment;

FIG. 7 is a diagram illustrating a process phase in the first embodiment;

FIG. 8 is a sequence diagram illustrating an example of a process executed according to proximity of a user terminal 20 with respect to a tag seal;

FIG. 9 is a diagram illustrating a configuration example of a device information storage 122;

FIG. 10 is a diagram illustrating a configuration example of a tag information storage 125;

FIG. 11 is a sequence diagram illustrating an example of a tag ID registration process;

FIG. 12 is a diagram illustrating a display example of a link setting screen;

FIG. 13 is a diagram illustrating a configuration example of a user information storage 124;

FIG. 14 is a diagram illustrating a configuration example of a service information storage 121;

FIG. 15 is a diagram illustrating a configuration example of a software information storage 123;

FIG. 16 is a sequence diagram illustrating an example of a service control process;

FIG. 17 is a diagram illustrating a display example of an initial state of a service screen;

FIG. 18 is a diagram illustrating a display example of a service screen to which a file name and a preview image are added;

FIG. 19 is a diagram illustrating a display example of a service screen in which graying out of a start button is canceled;

FIG. 20 is a diagram illustrating a configuration example of an information processing system according to a fourth embodiment;

FIG. 21 is a diagram illustrating a hardware configuration example of a user terminal 20a according to the fourth embodiment;

FIG. 22 is a diagram illustrating a hardware configuration example of an intermediation apparatus 50 according to the fourth embodiment;

FIG. 23 is a diagram illustrating an outline of the fourth embodiment;

FIG. 24 is a diagram illustrating functional configuration examples of the user terminal 20a, the server apparatus 10a, and the intermediation apparatus 50 according to the fourth embodiment;

FIG. 25 is a sequence diagram illustrating an example of a process executed in response to activation of the intermediation apparatus 50;

FIG. 26 is a diagram illustrating a configuration example of a device information storage 132;

FIG. 27 is a diagram illustrating a configuration example of a registration information storage 134;

FIG. 28 is a diagram illustrating a configuration example of an application information storage 131;

FIG. 29 is a sequence diagram illustrating an example of a procedure executed according to proximity of a user terminal 20a with respect to a tag seal;

FIG. 30 is a diagram illustrating a configuration example of a user information storage 133;

FIG. 31 is a diagram illustrating a display example of an upload screen;

FIG. 32 is a sequence diagram illustrating an example of an image data distribution process from a user terminal 20a to an intermediation apparatus 50;

FIG. 33 is a diagram illustrating a configuration example of an information processing system according to a fifth embodiment;

FIG. 34 is a diagram illustrating a hardware configuration example of an intermediation apparatus 50 according to the fifth embodiment;

FIG. 35 is a diagram illustrating functional configuration examples of the user terminal 20a, the server apparatus 10a, and the intermediation apparatus 50 according to the fifth embodiment;

FIG. 36 is a sequence diagram illustrating an example of an advance preparation process in the fifth embodiment.

FIG. 37 is a diagram illustrating a configuration example of a user information storage 133 according to the fifth embodiment; and FIG. 38 is a sequence diagram illustrating an example of a process executed in response to proximity of a user terminal 20a with respect to a transmission source of a message beacon.

DESCRIPTION OF EMBODIMENTS

First Embodiment

The following illustrates a first embodiment reference to the accompanying drawings. FIG. 1 is a diagram illustrating a configuration example of an information processing system according to a first embodiment. In the information processing system 1 illustrated in FIG. 1, a server apparatus 10, a user environment E1, one or more online storage systems 40, and the like are enabled to communicate with one another via a wide area network N1 such as the Internet. However, the network N1 may be a network such as an intranet that is enabled to be accessed within a predetermined range.

The user environment E1 is a system environment in an organization such as a company where various devices 30 are installed. In the user environment E1, devices 30 are connected to the network N1 via a LAN (Local Area Network) or the like within the organization. The devices 30 are enabled to bidirectionally communicate with the server apparatus 10 via the network N1. Note that examples of the device 30 include a multifunction peripheral, a printer, an electronic whiteboard, a projector, a PC (Personal Computer), and the like.

A user terminal 20 is an information processing terminal carried by each user of a device 30 in the user environment E1. For example, a smartphone, a tablet terminal, a mobile phone, or the like may be used as the user terminal 20. Note that the user terminal 20 may be directly connected to the network N1 (e.g., via a mobile communication network or the like) without communicating through a LAN or the like in the user environment E1. However, the user terminal 20 may be connected to a network within the user environment E1.

The server apparatus 10 is one or more computers that perform a process of providing a user with services that are one or more devices 30 or one or more software execution subjects by a simple operation using the user terminal 20. Note that the server apparatus 10 may be installed in the user environment E1.

The online storage system 40 is a computer system that provides a cloud service called online storage via a network. Online storage is a service for renting a storage area of storage.

FIG. 2 is a diagram illustrating a hardware configuration example of a server apparatus 10 according to the first embodiment. The server apparatus 10 in FIG. 2 has a drive device 100, an auxiliary storage device 102, a memory device 103, a CPU 104, an interface device 105, and the like which are mutually connected via a bus B.

A program for implementing a process in the server apparatus 10 is provided by a recording medium 101 such as a CD-ROM. When the recording medium 101 storing the program is set in the drive device 100, a program is installed from the recording medium 101 to the auxiliary storage device 102 via the drive device 100. Note that the program is not necessarily installed from the recording medium 101, and may be downloaded from another computer via the network. The auxiliary storage device 102 stores the installed programs and also stores necessary files, data, and the like.

The memory device 103 reads out a program from the auxiliary storage device 102 and stores the program upon receiving an instruction to activate the program. The CPU 104 executes functions relating to the server apparatus 10 according to a program stored in the memory device 103. The interface device 105 is used as an interface for connecting to a network.

FIG. 3 is a diagram illustrating a hardware configuration example of a user terminal 20 according to the first embodiment. In FIG. 3, the user terminal 20 includes a CPU 201, a ROM 202, a RAM 203, a touch panel 204, an auxiliary storage device 205, an NFC reader 206, and the like.

The ROM 202 and the auxiliary storage device 205 store programs and the like installed in the user terminal 20. The RAM 203 reads out a program from the ROM 202 or the auxiliary storage device 205 and stores the program upon receiving an instruction to activate the program. The CPU 201 implements a function relating to the user terminal 20 according to the program stored in the RAM 203.

The touch panel 204 is an electronic component having both an input function and a display function, and displays information, receives input from a user, and the like. The touch panel 204 includes a display device 211, an input device 212, and the like.

The display device 211 is a liquid crystal display or the like, and is responsible for a display function of the touch panel 204. The input device 212 is an electronic component including a sensor configured to detect contact of a contacted object with the display device 211. Note that the contacted object is an object that is in contact with a contact surface (surface) of the touch panel 204. An example of such an object may be a user's finger or a dedicated or general pen.

The NFC reader 206 reads information stored in the NFC tag.

FIG. 4 is a diagram illustrating an outline of the first embodiment. As illustrated in FIG. 4, a seal-type NFC tag (hereinafter simply referred to as "tag seal") is attached to the device 30. The tag seal stores a URL with respect to the server apparatus 10. The URL includes a tag ID as option information. The URL has the following format, for example.

https://xxx.yyy.com/?tagid=Tag03

In this case, the tag ID corresponds to the "XXX" part in "tagid=XXX" (i.e., "Tag03" in the above case). The tag ID is identification information that differs in accordance with each tag seal. However, the same tag ID may be assigned to a plurality of tag seals. Further, the "https://xxx.yyy.com/" part in the above case may be common to all the tag seals used within the user environment E1.

When the user holds the user terminal 20 over the tag seal attached to the device 30 (S1), the NFC reader 206 of the user terminal 20 reads a URL stored in the tag seal (S2). Subsequently, the user terminal 20 accesses the server apparatus 10 which is a destination ("https://xxx.yyy.com") of the URL (S3). In this case, the option information of the URL ("tagid=Tag03"), the identification information of a user of the user terminal 20 (hereinafter referred to as "user ID"), and the like are also indicated to the server apparatus 10.

The server apparatus 10 controls execution of a service registered in advance with respect to a combination of the user ID and the tag ID. For example, when the service is to cause a specific device 30 to execute some process (job), the server apparatus 10 transmits a control command for causing the device 30 to execute the process (S4). The device 30 executes a process according to the control command. Note that the devices 30 each have an API (Application Program Interface) for receiving a control command from the server apparatus 10 via a network. The API may be, for example, a Web API based on HTTP (HyperText Transfer Protocol).

Note that in a case where a process, which is registered in advanced with respect to a combination of the user ID and the tag ID, is printing of a file stored in the online storage system 40 in association with the user ID, the server apparatus 10 acquires the file and causes the device 30 to execute printing of the file.

Hence, the user can receive the service as described above by a simple operation of holding (bringing the user terminal 20) over the tag seal disposed (pasted) on the device 30. As described above, a service to be executed is specified according to a combination of a tag ID and a user ID. That is, different services for each user may be associated with respect to the same tag ID (i.e., the same tag seal).

In this embodiment, "service" is classified into the following types, for example.

FIG. 5 is a diagram illustrating examples of types of services. FIG. 5 indicates four types (1) to (4) of services.

Type (1) is a single service. Basically, there is one type of a device 30 or software used in the single service. For example, when the device 30 is a lighting of a conference room or the like and the user terminal 20 is held over by a tag seal attached to the device 30, a service of increasing brightness of the lighting may be given as an example of a single service.

Type (2) is a combination of input service and output service. The input service is a service for inputting or acquiring data to be processed in the service using software or a device 30. The output service is a service for outputting or saving data to be processed in the service using software or a device 30. The example illustrated in FIG. 4 corresponds to the type of (2). That is, in FIG. 4, "acquisition of a file stored in the online storage system 40 that is associated with a user ID" corresponds to an input service, and "printing of the file" corresponds to an output service.

Type (3) is a type in which a pipe service is inserted between an input service and an output service. The pipe service is a service that processes or converts data to be processed in a service using software or a device 30. For example, OCR (Optical Character Recognition), translation, or the like may be given as an example of a pipe service.

Type (4) is a complex combination of an input service, a pipe service, an output service and the like. For example, in this type of complex combination of services, data input from an input service is input to two or more pipe services or two or more output services, or an output service outputs data input from two or more input services or two or more pipe services.

Note that NFC tags are roughly divided into two types, "simple tags" and "active tags"; however, simple tags are preferable for tag seals of this embodiment. A simple tag is an NFC tag that can write information such as a URL from the NFC reader/writer and can read the information.

In order to demonstrate the process illustrated in FIG. 4, the user terminal 20 and the server apparatus 10 have a functional configuration as illustrated in FIG. 6.

FIG. 6 is a diagram illustrating functional configuration examples of a user terminal 20 and a server apparatus 10 according to the first embodiment. In FIG. 6, the user terminal 20 includes a tag communication unit 21, a browser unit 22, and the like. These units are implemented by a process which causes the CPU 201 to execute one or more programs installed in the user terminal 20.

The tag communication unit 21 acquires a URL including a tag ID from a tag seal using the NFC reader 206 and activates the browser unit 22 using the URL as input information. Note that the tag communication unit 21 may be implemented by a part of an OS (Operating System) of the user terminal 20.

The browser unit 22 is, for example, a general Web browser. The browser unit 22 transmits information including the tag ID included in the URL and the user ID of the user of the user terminal 20 to the portal unit 12 of the server apparatus 10 corresponding to the URL indicated as input information from the tag communication unit 21. The browser unit 22 also displays a Web page transmitted from the portal unit 12 on the display device 211.

The server apparatus 10 includes a controller 11, a portal unit 12, and one or more service units 13 such as service units 13a, 13b, and 13c. These units are implemented by a process which causes the CPU 104 to execute one or more programs installed in the server apparatus 10. The server apparatus 10 also uses the service information storage 121, the device information storage 122, the software information storage 123, the user information storage 124, the tag information storage 125, and the like. These storages may be implemented by using, for example, the auxiliary storage device 102 or a storage device or the like connectable to the server apparatus 10 via a network.

The portal unit 12 receives a user ID and a tag ID transmitted from the browser unit 22, and indicates the user ID and the tag ID to the controller 11. The portal unit 12 also transmits to the browser unit 22 a Web page indicating a screen relating to the service.

The controller 11 controls execution of services corresponding to the user ID and the tag ID indicated from the portal unit 12. Specifically, the controller 11 causes the service unit 13 corresponding to the service to execute a process relating to the service.

Each of the service units 13 executes a process for implementing a corresponding one of services.

Details of information stored in each of the storages will be described later.

The following illustrates a process executed in the information processing system 1. FIG. 7 is a diagram illustrating a process phase in the first embodiment.

First, a user associates a tag seal with a service (S10). This is because a relationship between the tag ID (tag seal) and the service may be made different with respect to each user as described above. Such association work is performed with respect to each tag seal used by a user.

Thereafter, the user is able to use a service associated with the user and the tag seal by holding the user terminal 20 over (close to) the tag seal associated with the service (S20). Note that FIG. 4 illustrates an outline of a process phase in S20.

FIG. 8 is a sequence diagram illustrating an example of a process executed according to proximity of a user terminal 20 with respect to a tag seal.

The controller 11 periodically acquires device information of the device 30 selected from the devices 30 registered in the device information storage 122 among the devices 30 in the user environment E1 (S101, S102).

FIG. 9 is a diagram illustrating a configuration example of the device information storage 122. As illustrated in FIG. 9, the device information storage 122 stores a subject ID, an IP address, a type, a model name, a name, a location, a device status, a device account, and the like, with respect to each device 30.

The subject ID is identification information of a device 30 as a service execution entity. The type is a type of a device 30. For example, "IWB" of the type indicates an electronic whiteboard, and "MFP" of the type indicates a multifunction peripheral. Other types may also additionally be defined. The model name is a product name of a device 30. The name is a name optionally assigned by a user to a device 30. The location is a location of a device 30. The device status is a current status of a device 30. In the present embodiment, the device status indicates one of three types of power supply statuses: "power off", "energy saving", and "power on". The "power off" status is a state in which the device 30 is unusable and cannot be shifted to the power on status by the controller 11. The "energy saving" status is a power saving state. The controller 11 may shift the status of the device 30 from "energy saving" to "power on" by calling an API of the device 30. The "power on" status is a status in which a device 30 is available for use. The device account is account information required when the server apparatus 10 remotely calls an API of the device 30.

For example, the subject ID, the IP address, and the device account may be registered in advance by an administrator or the like of the user environment E1. In this case, the controller 11 transmits an acquisition request of the device information to each device 30 relating to a corresponding IP address stored in the device information storage 122. The device information transmitted from the device 30 as a response to the acquisition request may include type, model name, name, location, device status. The controller 11 stores the device information received as a response in the device information storage 122 in association with the IP address of the transmission source.

Note that the device information may be acquired by a push indication from the device 30 or may be acquired by polling from the controller 11. In addition, SNMP (Simple Network Management Protocol) may be used to acquire device information. That is, the device information may be part of information constituting MIB (Management Information Base).

When the user holds the user terminal 20 over a tag seal attached to any of the devices 30 (hereinafter referred to as "target device 30") (S111), the tag communication unit 21 of the user terminal 20 acquires tag information stored in the tag seal using the NFC reader 206 (S112, S113). The tag information includes a URL including a tag ID (hereinafter referred to as "target tag ID") as option information. Subsequently, based on the fact that the tag information includes a URL, the tag communication unit 21 automatically activates the browser unit 22 using the URL as the input information (S114).

Subsequently, the browser unit 22 automatically transmits an HTTP request to an access destination (the portal unit 12 of the server apparatus 10) corresponding to the URL (hereinafter referred to as "target URL") as the input information (S115). In addition to the target tag ID, account information is included in the HTTP request. The account information is a cookie stored in association with the URL in the user terminal 20 when the user terminal 20 has previously accessed the URL and succeeded in the authentication. When the user terminal 20 has not accessed the URL previously, the account information is empty. In addition, the HTTP request may include positional information (expressed as "gps" in FIG. 8). The positional information is the latitude and longitude measured by the GPS (Global Positioning System) function of the user terminal 20. With the positional information being included in HTTP request, the server apparatus 10 may specify the device 30 in the vicinity of the user in a subsequent process.

Upon receiving of the HTTP request, the portal unit 12 authenticates the account information. When the authentication succeeds, steps subsequent to step S116 are executed. When the authentication fails (including the case where the account information is empty), the portal unit 12 transmits an input request for inputting the account information to the browser unit 22 as a response. In response to the input request, the browser unit 22 displays a login screen and receives input of account information including a tenant ID, a user ID, a password, and the like from the user. The browser unit 22 transmits the input account information to the portal unit 12. The portal unit 12 re-authenticates the account information, and when the authentication is successful, the portal unit 12 transmits a cookie generated based on the account information to the browser unit 22 as a response, and executes steps subsequent to step S116. The browser unit 22 that has received the cookie stores the cookie in the user terminal 20 in association with the target URL. The tenant ID is identification information assigned to each user environment E1 (e.g., for each company).

In step S116, the portal unit 12 specifies the user ID (hereinafter referred to as "target user ID") relating to the target tag ID and the account information, and transmits a tag ID registration check request to the controller 11 to check the presence or absence of registration of the target tag ID corresponding to the target user ID.

The controller 11 refers to the tag information storage 125 to check whether the target tag ID is registered (associated) with respect to the target user ID, and transmits information indicating the presence or absence of registration as a check result to the portal unit 12 (S117).

FIG. 10 is a diagram illustrating a configuration example of a tag information storage 125. As illustrated in FIG. 10, the tag information storage 125 stores, with respect to each user ID, a tag ID, identification information (hereinafter referred to as "service ID") of each of the input service and the output service associated with a combination of the user ID and the tag ID. In FIG. 10, tag IDs "Tag01" and "Tag02" are registered with respect to a user called "Taro" whose user ID is "Taro". When a target user ID is "Taro" and a target tag ID is one of these (e.g., "Tag01" and "Tag02"), the controller 11 transmits a response indicating that the target tag ID is registered with respect to the target user ID to the portal unit 12. However, when the target tag ID is neither "Tag01" nor "Tag02" (e.g., "Tag03"), the controller 11 transmits a response indicating that the target tag ID is not registered with respect to the target user ID to the portal unit 12.

As apparent from the fact that the combination of the input service and the output service is associated with the user ID and the tag ID in the tag information storage 125 in FIG. 10, the type (2) among the four types illustrated in FIG. 5 will be described in the present embodiment. However, when another type is adopted, the configuration of the tag information storage 125 may be changed according to the other type.

When the target tag ID is not registered with respect to the target user ID, a tag ID registration process is executed (S200). When the target tag ID is registered with respect to the target user ID, a service control process is executed (S300).

Next, details of step S200 will be described. FIG. 11 is a sequence diagram illustrating an example of a tag ID registration process.

In step S201, the portal unit 12 generates a Web page indicating a link setting screen for allowing a user to set a service associated with the target tag ID, and transmits the Web page to the browser unit 22. Upon receiving of the Web page, the browser unit 22 displays a link setting screen on the display device 211 based on the Web page.

FIG. 12 is a diagram illustrating a display example of the link setting screen. In FIG. 12, a link setting screen 510 includes an input service selection area 511, an output service selection area 512, an OK button 513, a cancel button 514, and the like.

The input service selection area 511 is an area for receiving the selection of the input service to be associated with the target tag ID, and a row including the service ID, the subject ID, the description and the like is displayed with respect to each input service of the selection candidate.

The out service selection area 512 is an area for receiving the selection of the out service to be associated with the target tag ID, and a row including the service ID, the subject ID, the description and the like is displayed with respect to each out service of the selection candidate.

The configuration of the link setting screen 510 illustrated in FIG. 12 corresponds to the type (2) in FIG. 5. When adopting another type, the link setting screen 510 may be generated so as to have a configuration suitable for another type.

Note that the input service and the output service selected as selection candidates on the link setting screen 510 are specified with reference to the user information storage 124.

FIG. 13 is a diagram illustrating a configuration example of a user information storage 124. In FIG. 13, the user information storage 124 stores, for each tenant ID, available service IDs of services available to users in the user environment E1 relating to a corresponding tenant ID. For example, three services with service IDs "SD_DISP", "SD_PRINT" and "SS_LATEST" are available to the user Taro, as illustrated in FIG. 13. In FIG. 12, three services in total are thus displayed as selection candidates. That is, FIG. 12 illustrates a display example of the link setting screen 510 when the target user ID is "Taro".

The contents of the user information storage 124 are registered in advance, for example, by an administrator or the like of the user environment E1.

The detailed information of the service relating to each service ID stored in the user information storage 124 is stored in the service information storage 121.

FIG. 14 is a diagram illustrating a configuration example of a service information storage 121. As illustrated in FIG. 14, the service information storage 121 stores, in association with each tenant ID, a service ID, a service name, a type, a subject ID and a description of each of services defined in the user environment E1 relating to the tenant ID.

The service name is a name of the service. The type is information indicating whether a service is an input service or an output service. That is, "input" indicates input service and "output" indicates output service. The subject ID is a subject ID of a subject executing the service. The subject identified by the subject ID is a device 30 or software. The description is a description of an outline of the service.

The subject ID beginning with "D_" means the subject ID of the device 30, and the subject ID beginning with "S_" means the subject ID of the software. The device information of each device relating to the subject ID beginning with "D_" is stored in the device information storage 122 (FIG. 9). The software information of each software relating to the subject ID beginning with "S_" is stored in the software information storage 123.

FIG. 15 is a diagram illustrating a configuration example of a software information storage 123. As illustrated in FIG. 15, the software information storage 123 stores a subject ID, a URL, a type, and a user account with respect to each candidate software of the service execution subject. The URL is a URL of the software. The type is a type of software based on how to handle data. "Storage" indicates online storage, and "DB" indicates database. The user account is account information for using the software.

Note that the portal unit 12 is enabled to generate a link setting screen 510 with reference to the user information storage 124 (FIG. 13) and the service information storage 121 (FIG. 14). Further, when positional information (gps) is included in the HTTP request in step S115 of FIG. 8, only the service whose location corresponds to the positional information may be selected as the selection candidate, with respect to a service executed by the device 30 (a service associated with a subject ID beginning with "D_").

The following description is given by referring back to FIG. 11. When a user selects any one of the input services in the input service selection area 511 of the link setting screen 510, selects any one of the output services in the output service selection area 512, and presses the OK button 513 (S202), the browser unit 22 transmits a registration request including the service ID (InSID) of the selected input service and the service ID (OutSID) of the selected output service to the portal unit 12 (S203).

In response to the registration request, the portal unit 12 designates the target tag ID, the InSID, the OutSID, and the target user ID, and requests the controller 11 to register the target tag ID (S204). In response to such a request, the controller 11 stores the target tag ID, the InSID, and the OutSID in association with the target user ID in the tag information storage 125 (FIG. 10) and transmits the registration result as a response (S205). The registration result is information indicating success of registration when both the service relating to InSID and the service relating to OutSID are services executed by software. However, when at least one of the service relating to the InSID and the service relating to the OutSID is a service executed by the device 30, the registration result is information indicating success of temporary registration. The success of temporary registration is a registration result indicating that it is necessary to check whether or not the device 30 executing the service to be associated with the target tag ID is the device 30 intended by the user. Note that whether the service relating to InSID or OutSID is executed by software or executed by the device 30 may be identified based on the subject ID associated with the service ID that begins with "S_" or "D_" in the service information storage 121 (FIG. 14).

When the registration result indicates success of registration, the portal unit 12 transmits a Web page indicating success of registration to the browser unit 22 (S206). With reference to the Web page displayed by the browser unit 22, the target user may be able to check that the registration of the target tag ID has been successful.

When the registration result indicates the success of temporary registration, the portal unit 12 transmits to the browser unit 22 a Web page indicating an instruction to repeat turning on/off of the power for a predetermined number of times within a predetermined time period (e.g., three minutes, etc.), with respect to the device 30 relating to the subject ID of the service relating to InSID or OutSID (S207). That is, when the service relating to the InSID is a service executed by the device 30, the device 30 is set as a target of turning on/off of the power. Further, when the service relating to the OutSID is a service executed by the device 30, the device 30 is set as a target of turning on/off of the power. When the service relating to the InSID and the service relating to the OutSID are services executed by two devices 30, the two devices 30 are set as a target of turning on/off of the power.

When the browser unit 22 displays the Web page (S208), the user recognizes that the user should perform the power ON/OFF operation with respect to the device 30 with which the user recognizes himself/herself as the service execution subject. Thus, the user operates the power button of the device 30 to repeat ON/OFF of the power of the device 30 a predetermined number of times within a predetermined time period (S209).

When the controller 11 transmits the information indicating the success of temporary registration as a response in step S205, the controller 11 starts monitoring a status of the device 30, which executes the service associated with the tag ID, the temporary registration of which has been successful. For example, the controller 11 may repeatedly execute a ping command for an IP address of the device 30, or may monitor a status of the device 30 by another method. When the monitoring target device 30 to be monitored by the controller 11 matches the device 30 on which the user turns on/off of the power as a result, the controller 11 may be enabled to detect that the power of the device 30 to be monitored (i.e., the device 30 that executes the service associated with the target tag ID) is turned ON/OFF a predetermined number of times within a predetermined time period (S210). In this case, the controller 11 indicates the registration success to the portal unit 12 (S211). The indication may include a target tag ID, an InSID, an OutSID, a target user ID, and the like. In response to the indication, the portal unit 12 transmits a Web page indicating success of registration to the browser unit 22 (S212). When the browser unit 22 displays the Web page, the target user is enable to check successful registration of the target tag ID.

When the controller 11 fails to detect ON/OFF of the power of the monitoring target device 30, the controller 11 deletes a record stored in the tag information storage 125 according to step S204 and indicates the registration failure to the portal unit 12. In this case, the portal unit 12 transmits the Web page indicating the registration failure to the browser unit 22.

Note that whether the service associated with the tag seal, over which the user terminal 20 is held, is executed by the device 30 intended by the user may be checked by a method other than the above. For example, when the device 30 relating to InSID or OutSID is a device 30 having a display device, the controller 11 may transmit a response indicating the success of the temporary registration in step S205, and may subsequently transmit a display instruction of a randomly generated PIN (Personal Identification Number) code to the device 30. In this case, the portal unit 12 may transmit the Web page for receiving the input of the PIN code to the browser unit 22 in step S207. When the user is able to check the PIN code displayed on the device 30 and the PIN code is input to the Web page, the portal unit 12 indicates the PIN code transmitted from the browser unit 22 to the controller 11. When the PIN code matches the PIN code generated by the controller 11, the controller 11 indicates the success of registration to the portal unit 12, and when the PIN code does not match the PIN code generated by the controller 11, the controller 11 indicates the failure of registration to the portal unit 12. Note that instead of the PIN code, a randomly generated character string may be used.

Successful registration of the tag ID allows the target user to receive the service, using the tag seal over which the user holds the user terminal 20.

Subsequently, details of step S300 will be described. FIG. 16 is a sequence diagram illustrating an example of a service control process. In the following, it is presumed that the target user is the user Taro and the target tag ID is "Tag01".

In step S301, the portal unit 12 transmits to the browser unit 22 a Web page indicating a screen (hereinafter referred to as "service screen") relating to the service (input service and output service) corresponding to the combination of the target user ID and the target tag ID included in the HTTP request, as an HTTP response to the HTTP request in step S115 of FIG. 8. The browser unit 22 displays the service screen on the display device 211 based on the Web page.

FIG. 17 is a diagram illustrating a display example of an initial state of a service screen. As illustrated in FIG. 17, the service screen 520 includes a title area 521, an input service area 522, a start button 523, and the like.

The title area 521 displays character strings to which the service name of the input service and the service name of the output service are connected by an arrow indicating the direction of flow of the data. The portal unit 12 refers to the tag information storage 125 (FIG. 10) to identify the service ID (SS_LATEST, SD_PRINT) of each of the input service and output service associated with the combination of the target user ID and the target tag ID, acquires the service name corresponding to each service ID from the service information storage 121 (FIG. 14), and generates the title area 521.

The input service area 522 is an area that displays a preview of data input by the input service. Since the execution of the input service has not been started at this point in time, the input service area 522 is blank.

The start button 523 is a button for receiving a service execution instruction from a user. At this point in time, since the conditions under which the service can be executed are not prepared, the start button 523 is grayed out and made inoperative.

Subsequently, the portal unit 12 specifies the target tag ID and the target user ID, and requests the controller 11 to start the service (S302). The controller 11 acquires from the tag information storage 125 (FIG. 10) the service ID (SS_LATEST) of the input service and the service ID (SD_PRINT) of the output service corresponding to the combination of the target tag ID and the target user ID, and generates a service unit 13a corresponding to the service ID (SS_LATEST) of the input service (S303). In this case, generation of the service unit 13a is, for example, generation of an object functioning as the service unit 13a. Alternatively, generation of the service unit 13a may be generation of a process functioning as the service unit 13a (activation of a program). In this case, the controller 11 associates software information (subject ID, URL, type, user account, etc.) stored in the software information storage 123 (FIG. 15) in association with the subject ID (S_WF1) of SS_LATEST, and inputs the software information into the service unit 13a.

Subsequently, the service unit 13a accesses the URL included in the input software information by using the user account included in the software information, and retrieves a software service for searching for the latest file from the online storage. In the software service, one or more online storage systems 40 used by a user relating to the user account are registered in advance. The software service retrieves the latest file among the files registered according to the user account from the online storage system 40 (S304), and acquires the file name of the latest file and a preview image (e.g., a preview image of the first page) (S305). Subsequently, the service unit 13a transmits the acquired file name and the preview image to the browser unit 22 (S306). The browser unit 22 applies the file name and the preview image to the service screen 520 and displays the applied service screen 520 (S307).

FIG. 18 is a diagram illustrating a display example of a service screen to which a file name and a preview image are added. As illustrated in FIG. 18, a preview image and a file name are added to the input service area 522 of the service screen 520.

With reference to the file name and the preview image displayed on the service screen 520, the target user may be able to check what the latest file is (S307).

Meanwhile, the controller 11 generates a service unit 13b corresponding to the output service (SD_PRINT) following generation of the service unit 13a or concurrently with generation of the service unit 13a (S311). In this case, the controller 11 inputs into the service unit 13b the device information (IP address, type, model name, name, location, device status, device account, etc.) associated with the subject ID (S_MFP1) of SD_PRINT and stored in the device information storage 122 (FIG. 9). This device information is hereinafter referred to as "target device information".

The service unit 13b checks a status of the device 30 (i.e., the target device 30) relating to an IP address (S312, S313), based on the IP address included in the target device information. A status of the device 30 may be checked by calling the API of the target device 30, or may be checked by using a general-purpose method such as a ping command. The status check of the target device 30 is repeated until the target device 30 that is normally activated ("power on") has been checked. When the normally activated target device 30 is checked, the service unit 13b transmits information indicating that the target device 30 is normally activated to the browser unit 22 (S314). However, when a status of the target device 30 is "energy saving", the service unit 13b may forcibly change a status of the target device 30 from "energy saving" to "power on".

Upon receiving of the information, the browser unit 22 checks whether the grayout cancelling condition of the start button 523 is satisfied. When the cancellation condition is satisfied, the graying out of the start button 523 is canceled and the start button 523 is enabled to be operable.

FIG. 19 is a diagram illustrating a display example of a service screen in which graying out of a start button is canceled. Note that the cancelling condition indicates that the file name and the preview image are displayed in the input service area 522 and the target device 30 is normally activated. Whether the cancelling condition is satisfied may be determined by a script in the Web page indicating the service screen 520, for example.

The target user refers to the service screen 520 as illustrated in FIG. 19 to check whether the service is in an available status (in this case, a printing service is in an executable status) (S315).

After generating the service unit 13b, the controller 11 indicates to the service unit 13a address information (e.g., a pointer or reference of an object) of the service unit 13b as output destination information (S321).

Thereafter, when the start button 523 is pressed (touched) by the target user (S331), the browser unit 22 transmits an execution request to the service unit 13a, based on the definition when the start button 523 is pressed on the Web page relating to the service screen 520 (S332). In response to the execution request, the service unit 13a acquires the latest file relating to the file name of the latest file searched in steps S304 and S305 from the online storage storing the latest file (S333, S334).

Subsequently, the service unit 13a indicates a service execution request to the service unit 13b relating to the output destination information indicated in step S321 (S325). The service execution request includes the latest file.

Subsequently, in response to the service execution request, the service unit 13b transmits a print request for the latest file included in the service execution request to the device 30 relating to the IP address included in the target device information (S336). The print request may be indicated to the device 30 via the API of the device 30. The device 30 executes printing of the latest file in response to the print request. Upon completion of printing, the device 30 transmits a response indicating a printing completion indication to the service unit 13b (S337). Subsequently, the service unit 13b indicates the completion of the service execution to the service unit 13a (S338). In response to the indication, the service unit 13a transmits a Web page indicating the completion of the service to the browser unit 22 (S339). When the browser unit 22 displays the Web page, the target user can check completion of the service (i.e., completion of printing) (S340). The target user then acquires printed matter output from the target device 30 (S341).

According to the above process, the user can experience an operational feeling that when the user holds the user terminal 20 over the tag seal attached to the target device 30, the latest file is printed by the target device 30.

In the above description, an example where retrieval of (search for) the latest file is an input service and printing is an output service has been described; however, when display on the electronic whiteboard is selected as the output service to be associated with the tag ID of the tag seal attached to the electronic whiteboard, the data input by the input service may also be displayed on the electronic whiteboard. In addition, each of combinations of one or more input services and one or more output services, or each of various single services may be associated with a corresponding tag seal (each tag ID), and each of the tag seals may be attached to a convenient place for a user. Accordingly, the user may use a service that facilitates a task more efficiently with a simple operation such as holding the user terminal 20 over each tag seal.

In the above example, the tag seal that is attached to a device 30 acting as a subject that executes an output service associated with the tag seal is described as an example for the sake of convenience; however, the attaching destination of the tag seal is not limited to this example. For example, a tag seal may be attached to any position of each user's desk or the like. When the tag ID of the tag seal is associated in advance with the printing service by a printer frequently used by the user, the user may be able to cause the printer to print data displayed on the user terminal 20 by simply holding the user terminal 20 over the tag seal attached to the desk.

As described above, according to the first embodiment, the user brings the user terminal 20 close to the tag seal to cause the device 30 to perform a process set in advance in association with the tag seal. That is, it is possible to provide novel operability with respect to the device 30. As a result, it is possible for a user to have reduced opportunities of operating different user interfaces, such as operation panels, with respect to different devices 30, and it is possible for a user to use each of the devices 30 with highly uniform operability across the devices 30.

In addition, by associating linkage of a plurality of services such as input service and output service with one tag ID, the user may be able to use the linkage of the services with a simple operation.

In the present embodiment, a preparatory work for a user to utilize the above services may basically be the registration of the tag ID, and the likelihood of requiring prior installation operations of a specific program on the user terminal, and the like is low.

In addition, because different services may be associated with each user with respect to the same tag ID, customization by user may be easily performed.

Second Embodiment

Next, a second embodiment will be described. In the second embodiment, features different from the first embodiment will be described. The features that are not specifically mentioned in the second embodiment may be the same as those in the first embodiment.

The first embodiment illustrates an example of an NFC tag being used as an external recording medium storing destination information (URL) of a service execution request; however, another external recording medium capable of executing near field communication may be used. For example, a Bluetooth (registered trademark) low energy (BLE) beacon which is an active radio frequency identification (RFID) tag may be used instead of the NFC tag. In such a case, the user terminal 20 may acquire the URL (tag ID) from the Bluetooth (registered trademark) signal. In the case of Bluetooth (registered trademark), since the communication distance is long, signals of a plurality of BLE beacons may be received by the user terminal 20 simultaneously. In this case, the user terminal 20 may display a list of URLs (tag IDs) of a plurality of signals and allow the user to select a URL (tag ID) to use from the list.

Alternatively, the user terminal 20 may acquire the URL (tag ID) by a method other than near field communication. For example, a seal on which a bar code or a two-dimensional code recording a URL (tag) ID is printed may be used instead of a tag seal. In this case, the user terminal 20 may acquire a URL (tag ID) by using a bar code reader or a two-dimensional code reader.

Alternatively, the user terminal 20 may acquire the URL (tag ID) from a seal on which an image is printed. In this case, the user terminal 20 may input the image with a digital camera and extract the URL (tag ID) from a copy-forgery-inhibited pattern or the like embedded in the image. Any known techniques may be used for embedding information by means of a copy-forgery-inhibited pattern or the like on an image or extracting information from a copy-forgery-inhibited pattern.

Third Embodiment

Next, a third embodiment will be described. In the third embodiment, features different from the first embodiment or the second embodiment will be described. The features that are not specifically mentioned in the third embodiment may be the same as those in the first embodiment or the second embodiment.

In the above embodiments, an example of the destination information of the service execution request being a URL has been described; however, an email address including a domain corresponding to the portal unit 12 of the server apparatus 10 may be used as the destination information. In this case, the tag communication unit 21 activates a mailer of the user terminal 20 and inputs an email address acquired from the external recording medium to the mailer. The mailer automatically sends an email to the mail address. The portal unit 12 may receive the email, and execute the process with a local part of the email address as a tag ID, for example.

Likewise, the destination information in another communication application or the like may be used instead of the URL.

Fourth Embodiment

Next, a fourth embodiment will be described. FIG. 20 is a diagram illustrating a configuration example of an information processing system according to the fourth embodiment. In the information processing system 2 illustrated in FIG. 20, a server apparatus 10a and a user environment E2 are enabled to communicate with each other via a wide area network N2 such as the Internet. However, the network N2 may be a network such as an intranet that is enabled to be accessed within a predetermined range.

The user environment E2 is a system environment in an organization such as a company or the like, in which one or more output devices such as a projector 60 and one or more intermediation apparatuses 50 are installed. The projector 60 is a device configured to project an input image onto a projection plane and is an example of an output device. In the user environment E2, the projectors 60 are each connected to intermediation apparatuses 50, respectively. That is, the projectors 60 are associated with the intermediation apparatuses 50 on a one-to-one basis. The projectors 60 and the intermediation apparatuses 50 are connected via an interface in compliance with a standard capable of transmitting images, such as HDMI (registered trademark) (High-Definition Multimedia Interface) or the like. For example, the projector 60 and the intermediation apparatus 50 may be connected by a cable such as HDMI (registered trademark) cable corresponding to the interface. Alternatively, a connector corresponding to the interface of the intermediation apparatus 50 may be directly connected with a connector corresponding to the interface of the projector 60. For example, the intermediation apparatus 50 may be inserted into the connector of the projector 60 so as to connect the intermediation apparatus 50 and the projector 60. Alternatively, the intermediation apparatus 50 and the projector 60 may be connected by radio communication, or may be connected via a network.

Since the projector 60 and the intermediation apparatus 50 are connected as described above, the intermediation apparatus 50 is enabled to transmit to the projector 60 an image to be projected.

The intermediation apparatus 50 is connected to the network N2 via a LAN or the like in the user environment E2. The intermediation apparatus 50 may be wirelessly connected to a LAN or the like in the user environment E2. The intermediation apparatus 50 includes a Web browser, and executes a process according to an execution request of a process relating to image data transmitted from the server apparatus 10a via the Web browser, so as to control an output device such as a projector 60 (e.g., causing the projector 60 to output the execution result of the process). Specifically, in the present embodiment, the intermediation apparatus 50 causes the projector 60 to execute output (e.g., projection) of the image data. That is, the intermediation apparatus 50 intermediates the output (e.g., projection) of an image by the projector 60 with respect to data transmitted from the server apparatus 10a. For example, a computer such as an HDMI (registered trademark) dongle, a stick PC or the like may be used as an intermediation apparatus 50.

A user terminal 20a is an information processing terminal carried by each user in the user environment E2. For example, a smartphone, a tablet terminal, a personal computer (PC), a mobile phone, or the like may be used as the user terminal 20a. Note that the user terminal 20a may be connected to a network N2 (e.g., via a mobile communication network) without communicating through a LAN or the like in the user environment E2. However, the user terminal 20a may be connected to a network within the user environment E2.

The server apparatus 10a is one or more computers that execute a process of outputting from the output device such as the projector 60 image data specified in the user terminal 20a by a simple operation using the user terminal 20a. Note that the server apparatus 10a may be installed in the user environment E2. The hardware configuration of the server apparatus 10a may be the same as the hardware configuration of the server apparatus 10 in each of the above embodiments.

FIG. 21 is a diagram illustrating a hardware configuration example of a user terminal 20a according to the fourth embodiment. Components illustrated in FIG. 21 similar to those illustrated in FIG. 3 are provided with the same reference numerals and descriptions of the components are thus omitted. In FIG. 21, the user terminal 20a has a near field communication device 206a instead of the NFC reader 206 and further includes a digital camera 207.

The near field communication device 206a is hardware for performing near field communication. In the fourth embodiment, the near field communication device 206a reads information stored in the NFC tag. That is, in the fourth embodiment, the near field communication device 206a is preferably an NFC reader. The digital camera 207 is a general digital camera having an image pickup function and may be incorporated as an electronic component in the user terminal 20a or may be externally connected to the user terminal 20a.

FIG. 22 is a diagram illustrating a hardware configuration example of an intermediation apparatus 50 according to the fourth embodiment. The intermediation apparatus 50 illustrated in FIG. 22 has an auxiliary storage device 501, a memory device 502, a CPU 503, a communication interface 504, an image interface 505, and the like.

A program for implementing a process in the intermediation apparatus 50 is installed in the auxiliary storage device 501. The auxiliary storage device 501 stores the installed programs and also stores necessary files, data, and the like.

Upon receiving of an instruction to activate a program, the memory device 502 reads the program from the auxiliary storage device 501 and stores the read program. The CPU 503 implements a function relating to the intermediation apparatus 50 in accordance with the program stored in the memory device 502. The communication interface 504 is a physical interface for connecting to a network. The image interface 505 is a physical interface for transmitting an image to a projector 60.

FIG. 23 is a diagram illustrating an outline of the fourth embodiment. As illustrated in FIG. 23, a seal-type NFC tag (hereinafter simply referred to as "tag seal") is attached to the projector 60. The tag seal stores information (hereinafter referred to as "tag information") including a URL (hereinafter referred to as an "initial access URL") to be first accessed by the user terminal 20a among URLs for accessing the server apparatus 10a. In the tag information, the initial access URL is provided with a registration ID as option information. The tag information may, for example, have the following form.

https://xxx.yyy.com/?tagid=Tag01

In this case, the registration ID corresponds to an "XXX" part in "tagid=XXX" (i.e., "Tag01" in the above case). The registration ID is identification information registered in the server apparatus 10a. A different registration ID may be assigned to each tag seal or the same registration ID may be assigned to a plurality of tag seals. Meanwhile, the "https://xxx.yyy.com/" part (initial access URL) in the above case may be common to all the tag information stored in the tag seals used within the user environment E2. Note that the registration ID is not required to be included in the initial access URL and may be stored separately from the initial access URL.

When the user holds, for example, the user terminal 20a over a tag seal attached to the projector 60 (S21), the near field communication device 206a of the user terminal 20a acquires tag information by reading the tag information stored in the tag seal (S22). Subsequently, the user terminal 20a accesses the server apparatus 10a which is the destination ("https://xxx.yyy.com") of the initial access URL included in the acquired tag information (S23). At this time, the registration ID and the like included in the acquired tag information are also transmitted to the server apparatus 10a.

The server apparatus 10a controls execution of a service registered in advance in association with the registration ID. For example, when the registered service is to cause a specific projector 60 to project image data captured by the user terminal 20a, the server apparatus 10a acquires from the user terminal 20a image data captured by the user terminal 20a and transmits the acquired image data to the intermediation apparatus 50 associated with the registration ID (S24). Note that the server apparatus 10a transmits, for example, display data of a screen prompting uploading of image data to the user terminal 20a, and receives from the user terminal 20a image data captured by the user terminal 20a in response to an operation performed by the user via the screen, thereby acquiring the image data.

Upon receiving of the image data from the server apparatus 10a, the intermediation apparatus 50 renders the image data. As a result, the rendering result is transmitted to the projector 60 (S25). The projector 60 projects the rendering result (i.e., the image data).

The user may thus be able to receive a service related to the output device as described above by a simple operation of acquiring the tag information from the outside of the user terminal 20a. For example, in the example described above, the user may be able to receive a service as described above by a simple operation of holding (bringing the user terminal 20a close to) over the tag seal arranged (affixed) on the projector 60. As described above, a service to be executed according to the registration ID is specified. That is, it is possible to associate a different service with respect to each registration ID.

In order to demonstrate the process described in FIG. 23, the user terminal 20a, the intermediation apparatus 50, and the server apparatus 10a have a functional configuration as illustrated in FIG. 24.

FIG. 24 is a diagram illustrating functional configuration examples of the user terminal 20a, the server apparatus 10a, and the intermediation apparatus 50 according to the fourth embodiment. In FIG. 24, the user terminal 20a includes an information acquisition unit 21a, a browser unit 22, and the like. These units are implemented by a process which causes the CPU 201 to execute one or more programs installed in the user terminal 20a.

The information acquisition unit 21a acquires tag information (initial access URL including a registration ID) from the tag seal using the near field communication device 206a, and activates the browser unit 22 with the tag information as input information. Note that the information acquisition unit 21a may be implemented by a process to be executed by the CPU 201 caused by a part of the OS (Operating System) of the user terminal 20a.

The browser unit 22 is, for example, a general Web browser and executes a process in accordance with HTML (HyperText Markup Language) data and script (e.g., JavaScript (registered trademark)) and the like. The browser unit 22 transmits a registration ID and the like included in the tag information URL to the application determination unit 15 of the server apparatus 10a corresponding to the initial access URL included in the tag information indicated as the input information from the information acquisition unit 21a. The browser unit 22 also accesses the application associated with the registration ID among the applications of the server apparatus 10a in accordance with the redirect request, which is a response from the application determination unit 15 in response to the access to the initial access URL. The browser unit 22 acquires data (HTML data, scripts, etc.) indicating a process execution request directed to the user terminal 20a from the application.

The intermediation apparatus 50 includes a communication controller 51, a browser management unit 52, a browser unit 53, and the like. These units are implemented by a process which causes the CPU 503 to execute one or more programs installed in the intermediation apparatus 50.

The communication controller 51 connects a bidirectional communication path (establishes a communication session) with the distribution unit 14 of the server apparatus 10a and functions as an endpoint on the intermediation apparatus 50 side in the bidirectional communication path (communication session). Through communication via the communication path (communication session), the intermediation apparatus 50 may indicate a status of the intermediation apparatus 50 to the server apparatus 10a, or may receive from the server apparatus 10a indication that the image data to be projected by the projector 60 is input to the server apparatus 10a (in the present embodiment, uploaded from the user terminal 20a).

The browser management unit 52 activates the browser unit 53 in, for example, a kiosk mode. The kiosk mode is a mode for restricting the use of the intermediation apparatus 50 to the display of the web page. Note that the kiosk mode is merely an example, and other modes may be used insofar as the mode is a mode in which a Web page can be displayed.

The browser unit 53 is, for example, a general Web browser and executes a process in accordance with HTML data and script and the like. In response to activation, the browser unit 53 accesses the initial access URL (i.e., the application determination unit 15 of the server apparatus 10a). At this time, identification information of the browser unit 53 (hereinafter referred to as "browser ID") is added as option information to the initial access URL. The browser unit 53 accesses the application associated with the browser ID among the applications of the server apparatus 10a in accordance with the redirect request, which is a response from the application determination unit 15 in response to the access to the initial access URL. The browser unit 53 acquires data (HTML data, scripts, etc.) indicating a process execution request directed to the intermediation apparatus 50 from the application.

The server apparatus 10a includes a distribution unit 14, an application determination unit 15, an upload application 16, an output application 17, and the like. These units are implemented by a process which causes the CPU 104 to execute one or more programs installed in the server apparatus 10a. The server apparatus 10a also uses the application information storage 131, a device information storage 132, a user information storage 133, a registration information storage 134, and the like. These storages may be implemented by using, for example, the auxiliary storage device 102 or a storage device or the like connectable to the server apparatus 10a via a network.

The distribution unit 14 receives, from the input source of the image data, the image data to be input with respect to a service associated with the registration ID, and indicates the input of the image data to the output destination of the image data in the service. Further, in response to a request from the output destination, the distribution unit 14 transmits the image data to the output destination. In the present embodiment, the input source is the user terminal 20a, and the output destination is the intermediation apparatus 50.

The application determination unit 15 determines an application corresponding to the initial access URL. In response to the access to the initial access URL, the application determination unit 15 refers to the registration information storage 134 to determine the application corresponding to the option information (registration ID or browser ID) assigned to the initial access URL. The application determination unit 15 transmits a response including a redirect request including the URL for the determined application to the access source of the initial access URL. In the present embodiment, in response to the access from the user terminal 20a which is the input source of the image data, the application determination unit 15 determines a URL of the upload application 16 as the application corresponding to the registration ID. In response to the access from the intermediation apparatus 50 which is the output destination of the image data, the application determination unit 15 determines a URL of the output application 17 as the application corresponding to the browser ID.

The upload application 16 and the output application 17 are examples of applications included in the server apparatus 10a in this embodiment. The upload application 16 is an application for causing the user terminal 20a to execute uploading of image data. Specifically, the upload application 16 transmits, to the user terminal 20a, HTML data, a script, and the like for causing the user terminal 20a to upload the image data. The output application 17 is an application for causing the intermediation apparatus 50 to execute acquisition (downloading) of and output of image data uploaded from the user terminal 20a. Specifically, the output application 17 transmits, to the intermediation apparatus 50, HTML data, a script, and the like for causing the intermediation apparatus 50 to execute such acquisition and output.

The application information storage 131 stores information (e.g., a URL) relating to each of applications (upload application 16 and output application 17 in the present embodiment) that are stored in the server apparatus 10a.

The user information storage 133 stores identification information and the like of users to whom the applications in the server apparatus 10a are accessible.

The device information storage 132 stores information indicating a status of the intermediation apparatus 50, for each of the intermediation apparatuses 50 arranged in the user environment E2.

The registration information storage 134 stores identification information of an application that executes an input process of image data, identification information of an application that executes an output process of image data, and identification information of the browser unit 53 of an intermediation apparatus 50, and the like, for each of the registration IDs.

The following illustrates a process executed in the information processing system 2. FIG. 25 is a sequence diagram illustrating an example of a process executed in response to activation of the intermediation apparatus 50.

When the power of the intermediation apparatus 50 is turned ON by the user (S501), the communication controller 51 establishes with the distribution unit 14 a communication path for asynchronously receiving a request from the distribution unit 14 of the server apparatus 10a (S502). In this case, the communication controller 51 indicates to the distribution unit 14 a communication ID which is the identification information of the communication controller 51 itself. The distribution unit 14 updates the device information storage 132, based on the indicated communication ID (hereinafter referred to as "target communication ID").

FIG. 26 is a diagram illustrating a configuration example of the device information storage 132. In FIG. 26, the device information storage 132 stores a tenant ID in association with a communication ID, address information, status information, a browser ID, a browser status, and the like. The tenant ID is identification information of a contractor (tenant) of a service contract provided by the server apparatus 10a. For example, the user environment E2 may correspond to one tenant. The communication ID is identification information of the communication controller 51 of each of the intermediation apparatuses 50 arranged in the tenant relating to the tenant ID. When the intermediation apparatus 50 includes only one communication controller 51, the communication ID may be identification information for identifying the intermediation apparatus 50. The address information is a local IP address of the intermediation apparatus 50. The status information is information indicating whether the communication controller 51 relating to the communication ID is currently connected (established communication path) or not connected ("unconnected") with the server apparatus 10a. The browser ID is identification information of the browser unit 53 corresponding to the communication controller 51 relating to the communication ID. In the present embodiment, the browser ID is identification information of the browser unit 53, which is included in the same intermediation apparatus 50 as the communication controller 51 relating to the communication ID. The browser status is information indicating an activation status of the browser unit 53 relating to the browser ID.

For example, when the target communication ID indicated to the distribution unit 14 is "Eg001-01", the status information corresponding to the communication ID ("Eg001-01") in the device information storage 132 is changed to "currently connected" as illustrated in FIG. 26.

Subsequently, the communication controller 51 searches for a browser management unit 52 to acquire a browser ID using, for example, SNMP (Simple Network Management Protocol) or the like (S503), and acquires, from the found browser management unit 52, the browser ID which is the identification information of the browser unit 53 (S504). The browser unit 53 is a management target of the browser management unit 52. In the present embodiment, the intermediation apparatus 50 that includes the communication controller 51 and the browser management unit 52 is illustrated as an example. However, a browser management unit 52 is searched for using SNMP or the like, in order to enable the communication controller 51 of the intermediation apparatus 50 to optionally use a plurality of browser management units 52 and the browser units 53 by communicating with the browser management units 52 of the other intermediation apparatuses 50 via the same network. The searching for a browser management unit 52 is not necessarily indispensable and the acquisition destination (the browser management unit 52) for which the communication controller 51 acquires the browser ID may be set in advance.

Subsequently, the communication controller 51 transmits indication that the browser unit 53 (browser unit 53 of the intermediation apparatus 50 in the present embodiment) corresponding to the acquired browser ID has become available to the distribution unit 14 by designating the browser ID (hereinafter called "target browser ID") of the browser unit 53 (S505). Upon receiving of the indication, the distribution unit 14 updates the device information storage 132 (FIG. 26) based on the target browser ID specified in the indication. Specifically, in the device information storage 132, the value of the browser status corresponding to the target browser ID is updated from "power off" to "power on".

Subsequently, the communication controller 51 designates the target browser ID and an initial access URL, and requests the browser management unit 52 to activate the browser unit 53 relating to the target browser ID (S506). As described above, the initial access URL is a URL that the browser unit 53 should first access, and is set in advance in the browser management unit 52.

In response to a request from the communication controller 51, the browser management unit 52 activates the browser unit 53 relating to the target browser ID in the kiosk mode (S507). When the browser management unit 52 activates the browser unit 53, the browser management unit 52 inputs the initial access URL to the browser unit 53. In response to activation in the kiosk mode, the browser unit 53 transmits an HTTP request to the input initial access URL (S508). The HTTP request includes a target browser ID.

Upon receiving of the HTTP request, the application determination unit 15 of the server apparatus 10a transmits a response (HTTP response) including a redirect request to the browser unit 53 (S509). The redirect request includes a URL of the application associated with the browser ID as the redirect destination. In addition, the redirect request includes the communication URL and the target browser ID included in the HTTP request as indication information directed to the redirect destination. The communication URL is a URL of the communication controller 51.

Note that the application determination unit 15 refers to the registration information storage 134 and the application information storage 131, and specifies a URL of the application associated with the target browser ID.

FIG. 27 is a diagram illustrating a configuration example of the registration information storage 134. In FIG. 27, the registration information storage 134 stores a registration ID, an In application ID, an Out application ID, and a browser ID in association with one another other.

The In application ID is an ID (hereinafter referred to as "application ID") of an application that controls input of image data in a service corresponding to the registration ID. "AP_Upload" indicates an application ID of the upload application 16. The Out application ID is an ID (hereinafter referred to as "application ID") of an application that controls output of image data in a service corresponding to the registration ID. "AP_PhotoShow" indicates the application ID of the output application 17. The browser ID is a browser ID of the browser unit 53 corresponding to the registration ID.

FIG. 28 is a diagram illustrating a configuration example of an application information storage 131. In FIG. 28, the application information storage 131 stores an application ID, an application type, a URL, and the like, for each of applications included in the server apparatus 10a.

The application type indicates a type based on a relationship with image data of an application relating to the application ID. "In" indicates an application (corresponding to the above-described "In application ID") that controls input of image data. "Out" indicates an application that controls output of image data (corresponding to the above-described "Out application ID"). The URL is a URL of an application relating to the application ID.

The application determination unit 15 refers to the registration information storage 134 to specify the Out application ID associated with the target browser ID, and refers to the application information storage 131 to specify the URL associated with the Out application ID. Note that it is presumed that the target browser ID is "BROWSER 1". In this case, the application determination unit 15 specifies a URL (hereinafter, "output application URL") of the application (output application 17) having an application ID being "AP_PhotoShow".

The application determination unit 15 automatically generates a communication URL of the communication controller 51 relating to a target communication ID, based on address information associated with the target browser ID in the device information storage 132 (FIG. 26).

Subsequently, in accordance with the redirect request, the browser unit 53 transmits (redirects) the HTTP request to the output application URL (i.e., the output application 17) which is a redirect destination (S510). The HTTP request includes the communication URL and the browser ID included in the redirect request.

In response to the HTTP request, the output application 17 transmits to the browser unit 53 a response including a script (photo.js) for causing the browser unit 53 to execute a connection to the communication URL included in the HTTP request and display data for causing the browser unit 53 to render a user interface for outputting image data (e.g. slide show) (S511). The script and the display data are examples of data indicating a process execution request addressed to the intermediation apparatus 50. For example, the script may be a program in another format, or the display data may be data in another format.

Upon receiving of the response, the browser unit 53 executes a script (photo.js) included in the response and establishes a communication path with the communication controller 51 identified by the communication URL (S512).

The communication path is a communication path for propagating the indication received by the communication controller 51 from the server apparatus 10a to the browser unit 53. Websocket may be used for this communication path.

Subsequently, the browser unit 53 renders a screen (hereinafter referred to as "projection screen") based on the display data (photo.html) included in the response in a predetermined area (e.g., video memory) of the memory device 103 (S513). For example, the projection screen is a screen that functions as a frame to which image data distributed from the server apparatus 10a is applied. The rendering content (projection screen) by the browser unit 53 is output to the projector 60 via an interface such as HDMI (registered trademark), and is output (projected) by the projector 60.

FIG. 29 is a sequence diagram illustrating an example of a process executed according to proximity of a user terminal 20a with respect to a tag seal.

When the user brings the user terminal 20a close to (e.g., holds the user terminal over) the tag seal attached to the projector 60 (S601), the information acquisition unit 21a acquires tag information stored in the tag seal via near field communication using the near field communication device 206a (S602, S603). The tag information includes an initial access URL to which a registration ID (hereinafter referred to as "target registration ID") is provided as option information. In the present embodiment, it is presumed that a value of the target registration ID is "Tag01".

Subsequently, based on the fact that the tag information includes a URL, the information acquisition unit 21a activates the browser unit 22 using the tag information as input information (S604).

In response to activation, the browser unit 22 automatically transmits an HTTP request to the application determination unit 15 corresponding to the initial access URL included in the tag information acting as input information (S605). In addition to the target tag ID, account information is included in the HTTP request. The account information is information including identification information of a user of a user terminal 20a (hereinafter referred to as "user ID") and a tenant ID of a user environment E2 to which the user belongs, or information that can identify the user ID and the tenant ID. For example, cookies or the like may be used as account information.

Upon receiving of the HTTP request, the application determination unit 15 of the server apparatus 10a authenticates account information included in the HTTP request. When the authentication succeeds, steps subsequent to step S606 are executed. The authentication is performed, for example, based on whether or not the account information included in the HTTP request is registered in the user information storage 133.

Figure 30:
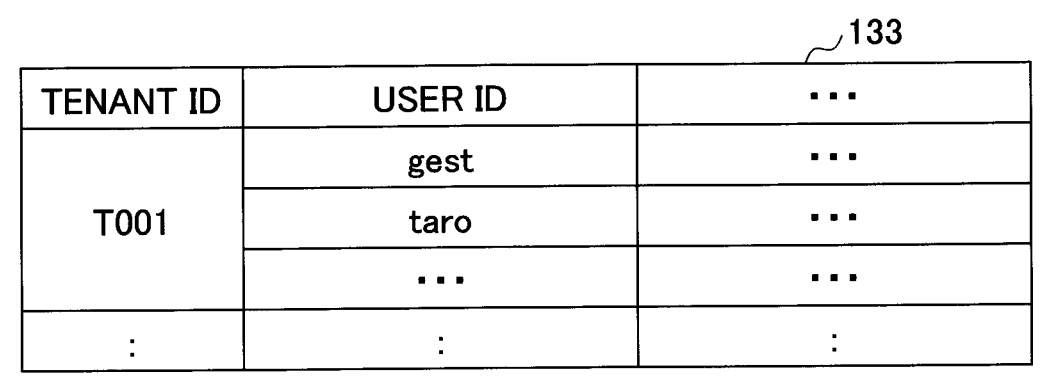

FIG. 30 is a diagram illustrating a configuration example of a user information storage 133. In FIG. 30, the user information storage 133 stores a tenant ID, a user ID, and the like with respect to each user who is allowed to use applications of the server apparatus 10a.

Upon successful authentication, the application determination unit 15 transmits a response (HTTP response) including a redirect request to the browser unit 22 (S606). The redirect request includes an upload application 16 ("AP_Upload") relating to the In application ID ("AP_Upload"), which is associated with the target registration ID ("Tag01") as a redirect destination and is stored in the registration information storage 134. The upload application URL may be specified with reference to the application information storage 131 (FIG. 28).

In accordance with the redirect request, the browser unit 22 transmits an HTTP request (redirect) to the upload application URL (i.e., the upload application 16) that is the redirect destination (S607).

In response to the HTTP request, the upload application 16 transmits, to the browser unit 22, a response including display data (upload.html) of a screen (hereinafter referred to as "upload screen") associated with uploading of image data to the distribution unit 14 of the server apparatus 10a and a script (upload.js) for causing the user terminal 20a to execute the uploading in response to the operation of the upload screen (S608). The script and the display data are examples of data indicating a process execution request addressed to the user terminal 20a.

Upon receiving of the response, the browser unit 22 generates an upload screen based on the display data (upload.html), and displays the upload screen on the display device 211 (S609).

FIG. 31 is a diagram illustrating a display example of an upload screen. In FIG. 31, the upload screen 610 includes a button 611 and the like. The button 611 is a screen for receiving an instruction to start imaging operation. A user selects the button 611 to perform imaging. As a result, the captured image data is displayed on the display device 211.

FIG. 32 is a sequence diagram illustrating an example of an image data distribution process from a user terminal 20a to an intermediation apparatus 50.

When a user performs a predetermined operation (e.g., swiping or the like) corresponding to the upload instruction (S701) with respect to image data (hereinafter referred to as "target image data") displayed on the display device 211 of the user terminal 20a, the browser unit 22 transmits (uploads) target image data (photo.jpeg) and a target registration ID to the distribution unit 14 of the server apparatus 10a, in accordance with the definition of the script (upload.js) (S702). Upon receiving of the target image data and the target registration ID, the distribution unit 14 assigns identification information (hereinafter referred to as "image ID") to the target image data, and stores the target image data in association with the image ID (hereinafter referred to as "target image ID"), for example, in the auxiliary storage device 102 or the like.

Subsequently, the distribution unit 14 specifies the browser ID (target browser ID) associated with the target registration ID and stored in the registration information storage 134 (FIG. 27). The distribution unit 14 uses the communication path established with the communication controller 51 associated with the communication ID (target communication ID), which is stored in association with the target browser ID in the device information storage 132 (FIG. 26), and transmits indication (hereinafter referred to as "upload indication") that the image data has been uploaded to the communication controller 51 (S703). The upload indication includes the target image ID and the target browser ID.

Upon receiving of the upload indication, the communication controller 51 uses a communication path established between the browser unit 53 corresponding to the browser ID included in the upload indication and the communication controller 51 (the communication path established in step S512 in FIG. 25), and indicates the target image ID included in the upload indication to the browser unit 53 (S704).

In response to the indication from the communication controller 51, the browser unit 53 transmits an image data acquisition request to the distribution unit 14 (S705) in accordance with the definition of the script (photo.js). The acquisition request includes the target image ID. In response to the acquisition request, the distribution unit 14 transmits a response including the image data (photo.jpeg) associated with the target image ID included in the acquisition request to the browser unit 53 (S706).

Upon receiving of the image data, the browser unit 53 renders the image data in a predetermined area (e.g., a video memory) of the memory device 103 so as to apply the image data to the projection screen rendered in step S513 of FIG. 25 (S707). The rendering content is transmitted to the projector 60 by the image interface 505 or the communication interface 504 of the intermediation apparatus 50. As a result, the rendering content is projected by the projector 60.

Through the process described above, a service such as outputting of the image data by the output device such as the projector 60 is executed every time the user terminal 20a images the image data. For example, image data captured in the hall can be sequentially displayed on a large display screen by using the service at a venue such as a party, a seminar, an exhibition, and the like.

In the above example, the device connected to the intermediation apparatus 50 is the projector 60, but other devices such as a digital signage, an electronic whiteboard, a display, or a printer may be connected to the intermediation apparatus 50 instead of the projector 60. In this case, the rendering contents of the intermediation apparatus 50 may be displayed on a digital signage, an electronic whiteboard, a display, or the like, or may be printed by a printer.

In the above example, the tag seal that is attached to the projector 60 associated with the tag seal is described for the sake of convenience; however, the attaching destination of the tag seal is not limited to this example. For example, a tag seal may be attached to any position of the room in which the projector 60 is disposed.

As described above, according to the fourth embodiment, a user may cause a device (e.g., the projector 60) connected to the intermediation apparatus 50 to execute a process set in advance in association with the tag seal (registration ID) by bringing the user terminal 20a close to the tag seal. That is, since the user does not need to directly operate the projector 60 or the like, and is capable of operating the projector 60 or the like by operating of the user terminal 20a, the operability with respect to the device such as the projector 60 may be improved.

The screen displayed on the user terminal 20a is based on display data such as HTML data distributed from the server apparatus 10a, and the dependency on a device associated with a tag seal is thus low. According to the present embodiment, it is possible to reduce the number of times for a user to operate different user interfaces such as operation panels differing according to device, and to increase the number of times for a user to use different devices through highly uniform operations across the devices.

Further, the intermediation apparatus 50 intervenes between the server apparatus 10a and the device (the projector 60); hence, the present embodiment may be applied insofar as the devices have an interface for transmitting image data despite the fact that the devices do not have a network function. Further, when a user desires to switch the device acting as the output destination of the image data, the user merely switches the device to be connected to the intermediation apparatus 50. Hence, it is not necessary to change the setting information in the server apparatus 10a.

Further, in the present embodiment, the user terminal 20a may simply need to be installed with a program that is included in a general smartphone or the like, and need not be installed with a special application.

Further, the intermediation apparatus 50 may merely need to be connected to the device via an interface for transmitting image data; hence, a connection setting with a wireless LAN via a router or a connection setting with a wired LAN is not required.

In the fourth embodiment, an NFC tag is illustrated as an example of an external recording medium that stores tag information; however, in this configuration, the user terminal 20a may acquire tag information from the outside, or the tag information may be acquired by a method other than near field communication. For example, a seal, on which a bar code or two-dimensional code recording tag information is printed, may be used instead of a tag seal. In this case, the user terminal 20a may acquire tag information, using a barcode reader or a two-dimensional code reader, a digital camera 207, or the like. The bar code or the two-dimensional code is not necessarily printed on the seal. The bar code or the two-dimensional code may be displayed on the display of the output device, or may be printed on an external recording medium other than the output device itself or the seal. The tag seal of the NFC tag described above is merely an example, and an external recording medium other than the seal may have an NFC tag.

Alternatively, the user terminal 20a may receive a sound wave or a later described beacon transmitted from a transmitter, which is provided in the periphery of the output device or provided in the output device itself, and acquire the tag information embedded in the received sound wave or beacon.

Or, the user terminal 20a may acquire tag information that is stored by accessing the device disposed in the periphery of the output device or in the output device itself via the network.

Further, the user terminal 20a may acquire tag information from an external recording medium (e.g., a seal) on which an image is printed. In such a case, the user terminal 20a may input an image by the digital camera 207 and may extract tag information from a copy-forgery-inhibited pattern or the like embedded in the image. Any known techniques may be used for embedding information by means of a copyforgery-inhibited pattern or the like on an image or extracting information from a copy-forgery-inhibited pattern.

Fifth Embodiment

Next, a fifth embodiment will be described. In the fifth embodiment, features different from the fourth embodiment will be described. The features that are not specifically mentioned in the fifth embodiment may be the same as those in the fourth embodiment.

In the fifth embodiment, a message application such as LINE (registered trademark) or the like is used. In the fifth embodiment, a beacon (i.e., a Bluetooth [registered trademark] low energy [BLE] beacon) for the message application 23 that includes the registration ID may be used instead of the tag seal. Hereinafter, this beacon is referred to as "message beacon".

FIG. 33 is a diagram illustrating a configuration example of an information processing system according to the fifth embodiment. Components illustrated in FIG. 33 similar to those illustrated in FIG. 20 are provided with the same reference numerals and descriptions of the components are thus omitted.

In FIG. 33, the network N2 is further connected with a message service 70. The message service 70 is one or more computers that provide a service to the message application 23 (function as a server with respect to the message application 23). A user of the message application 23 performs user registration with respect to the message service 70 and receives the issuance of the user ID for the message application 23.

FIG. 34 is a diagram illustrating a hardware configuration example of an intermediation apparatus 50 according to the fifth embodiment. Components illustrated in FIG. 34 similar to those illustrated in FIG. 22 are provided with the same reference numerals and descriptions of the components are thus omitted. In FIG. 34, the intermediation apparatus 50 further includes a near field communication device 506. The near field communication device 506 is hardware for performing near field communication such as BLE. In the present embodiment, the near field communication device 506 is used for transmitting a message beacon.

FIG. 35 is a diagram illustrating functional configuration examples of the user terminal 20a, the server apparatus 10a, and the intermediation apparatus 50 according to the fifth embodiment. Components illustrated in FIG. 35 similar to those illustrated in FIG. 24 are provided with the same reference numerals and descriptions of the components are thus omitted.

In FIG. 35, the user terminal 20a further includes a message application 23. The details of the message application 23 are as already described above.

The server apparatus 10a further includes a message bot 18. The message bot 18 is a program (Bot) for automatically executing transmission and reception of a message with respect to the message application 23.

FIG. 36 is a sequence diagram illustrating an example of an advance preparation process in the fifth embodiment. In the fifth embodiment, a process illustrated in FIG. 36 is executed as advance preparation.

In step S801, the message bot 18 is registered as a user with respect to the message service 70, and a user ID (hereinafter referred to as "message bot ID") is issued with respect to the message bot 18.

Thereafter, the message bot ID is indicated with respect to a user of the user terminal 20a (S802). For example, an email, a QR code (registered trademark), or the like that includes a message bot ID is transmitted to the user terminal 20a.

When the user inputs the received message bot ID to the message application 23 of the user terminal 20a and instructs the message application 23a to perform friend registration (S803), the message application 23 transmits a friend registration request including a user ID of the user associated with the message application 23 (hereinafter referred to as "message user ID") and the input message bot ID to the message service 70 (S804). By performing friend registration, the message application 23 may be enabled to immediately receive indication (message) from the message bot 18.

Upon receiving of the friend registration request, the message service 70 indicates, to the message bot 18 relating to the message bot ID included in the friend registration request, that the user relating to the message user ID included in the friend registration request is registered as a friend (S805).

Subsequently, in order to transmit a message beacon from the intermediation apparatus 50, the message bot 18 transmits a beacon application including the message bot ID to the message service 70, and receives a hardware ID (hereinafter referred to as "HID") to be included in the message beacon from the message service 70 (S806).

Subsequently, the message bot 18 transmits a beacon registration request for transmitting a message beacon to the communication controller 51 of the intermediation apparatus 50 relating to the tenant ID corresponding to the message user ID, with respect to which the message bot 18 has been registered as a friend (S807). The registration request includes an HID, a browser ID corresponding to the tenant ID, and a registration ID corresponding to the browser ID. The tenant ID corresponding to the message user ID may be identified with reference to the user information storage 133.

FIG. 37 is a diagram illustrating a configuration example of a user information storage 133 according to the fifth embodiment. As illustrated in FIG. 37, in the fifth embodiment, in the user information storage 133, a combination of a tenant ID and a user ID is associated with each message user ID. With reference to the user information storage 133, the message bot 18 is thus enabled to specify a tenant ID corresponding to the message user ID.

In addition, the browser ID corresponding to the tenant ID may be specified with reference to the device information storage 132 (FIG. 26). Further, the registration ID corresponding to the browser ID may be specified with reference to the registration information storage 134 (FIG. 27).

Subsequently, upon receiving of the registration request, the communication controller 51 transmits a beacon including the target registration ID and the HID to the browser management unit 52 corresponding to the browser unit 53 relating to the browser ID included in the registration request (S808). Subsequently, the browser management unit 52 requests the near field communication device 506 to transmit a message beacon including the target registration ID and the HID (S809). As a result, the near field communication device 506 of the intermediation apparatus 50 starts transmitting a message beacon including the target registration ID and the HID.

FIG. 38 is a sequence diagram illustrating an example of a process executed in response to proximity of a user terminal 20*a* with respect to a transmission source of a message beacon. Note that the process of FIG. 25 is executed before execution of the process of FIG. 38.

When the user brings the user terminal 20*a* close to the intermediation apparatus 50 that transmits the message beacon (S901), the information acquisition unit 21*a* of the user terminal 20*a* receives the message beacon by using the near field communication device 206*a* (S902), and acquires the HID (hereinafter referred to as "target HID") and the registered ID (hereinafter referred to as "target registration ID") (S903). That is, in the fifth embodiment, the near field communication device 206*a* is hardware capable of receiving a beacon by BLE or the like transmitted from the near field communication device 506 of the intermediation apparatus 50. In the present embodiment, it is presumed that a value of the target registration ID is "Tag01".

Subsequently, the information acquisition unit 21*a* indicates contents (the target HID and the target registration ID) of the message beacon to the message application 23 of the user terminal 20*a*, based on the format of the message beacon being in a format corresponding to the message application 23 (S904). In response to the indication of the contents of the message beacon, the message application 23 transmits indication of reception of the message beacon (hereinafter referred to as "beacon reception indication") to the message service 70 (S905). In this case, the message application 23 includes a message user ID, the target HID and the target registration ID of the user of the user terminal 20*a* in the beacon reception indication.

The message service 70 transmits the beacon reception indication to the message bot 18 corresponding to the target HID (S906). That is, in the message service 70, the message bot 18 and the like, which have received the issuance of the HID, are managed in association with the HID. Note that the beacon reception indication further includes a message ID for identifying the beacon reception indication. The message service 70 stores the contents (message user ID and the like) included in the beacon reception indication in association with the message ID.

Upon receiving of the beacon reception indication, the message bot 18 transmits to the message service 70 a response with respect to the beacon reception indication (S907). The response includes a one-shot ID and an initial access URL in addition to the message ID and target registration ID included in the beacon reception indication. As described in the fourth embodiment, the initial access URL is a URL with respect to the application determination unit 15. In the fifth embodiment, the initial access URL is set in advance in the message bot 18. In addition, the one-shot ID is identification information for restricting a period during which login to the server apparatus 10*a* is allowed, and is automatically generated by the message bot 18. For example, a one-shot ID may be a value based on the current date and time, or may be a value based on a date and time indicating a time limit that allows login. Note that when a period during which login to the server apparatus 10*a* is allowed is not restricted, a one-shot ID is not required to be generated.

Subsequently, in response to a response from the message bot 18, the message service 70 transmits to the message user ID stored in association with the message ID included in the response, contents of the response from the message bot 18 (initial access URL, one-shot ID, message user ID, target registration ID, etc.) as a message from the message bot 18 (S908). For example, the message includes an operation button associated with a link to an initial access URL including the one-shot ID, the message user ID, and the target registration ID as option information.

When the message application 23 of the user terminal 20*a* corresponding to the message user ID receives the message, the message application 23 displays the message on the display device 211 (S909). As a result, the user may be able to check the message.

Subsequently, when the user presses an operation button included in the message (S910), the message application 23 automatically activates the browser unit 22 using input information of the initial access URL indicated by the link associated with the operation button (S911). Note that when the message application 23 has its own browser, the browser may be used as the browser unit 22.

In response to activation, the browser unit 22 automatically transmits an HTTP request to the application determination unit 15 corresponding to the initial access URL included in the input information (S912). The HTTP request includes option information (one-shot ID, message user ID, target registration ID) of the initial access URL.

Upon receiving of the HTTP request, the application determination unit 15 of the server apparatus 10*a* authenticates the message user ID and the one-shot ID included in the HTTP request. For example, when the message user ID is stored as a message user ID of one of the users in the user information storage 133 (FIG. 37) and the one-shot ID has not expired, the authentication is successful, and otherwise the authentication fails.

When the authentication is successful, steps the same as the steps S606 to S609 of FIG. 29 are executed (S913 to S916). As a result, the upload screen 610 (FIG. 31) is displayed on the display device 211 of the user terminal 20a.

Thereafter, in accordance with the imaging of the image data performed by the user terminal 20a, the process illustrated in FIG. 32 is executed.

As described above, according to the fifth embodiment, the same effect as that of the fourth embodiment may be obtained without using a tag seal.

Output devices such as the server apparatus 10a, the intermediation apparatus 50 and the projector 60, the user terminal 20a, and the message service 70 in the above embodiments may each be constructed by a single computer, or may each (function or unit) be separately constructed by a plurality of assigned computers.

Note that each function of the above-described embodiment may be implemented by one or a plurality of processing circuits. Here, the "processing circuit" in this specification means a processor programmed to execute each function by software, such as a processor implemented by an electronic circuit, and a processor designed to execute each function described above including an ASIC (Application Specific Integrated Circuit), a DSP (digital signal processor), a field programmable gate array (FPGA), and a device 30 such as a conventional circuit module.

In each of the above embodiments, the user terminal 20 (20a) is an example of a terminal. The server apparatus 10 (10a) is an example of an information processing apparatus. The tag communication unit 21 is an example of an acquisition unit. The browser unit 22 is an example of a transmitter. The portal unit 12 or the application determination unit 15 is an example of a receiver. The tag ID is an example of first identification information. The user ID is an example of second identification information. The upload application 16 is an example of a controller.

The embodiments of the present invention have been described in detail above; however, the present invention is not limited to a specific one of the embodiments, and various modifications and changes may be made within the scope described in the claims. Although the embodiments of the present invention have been described in detail above, the present invention is not limited to such specific embodiments, and various modifications and changes may be made within the scope of the gist of the invention described in the claims.

REFERENCE SIGNS LIST 1, 2 information processing system
10, 10a server apparatus
11 controller
12 portal unit
13 service unit
14 distribution unit
15 application determination unit
16 upload application
17 output application
18 message bot
20, 20a user terminal
21 tag communication unit
21a information acquisition unit
22 browser unit
23 message application
30 device
40 online storage system
50 intermediation apparatus
51 communication controller
52 browser management unit
53 browser unit
60 projector
70 message service
100 drive device
101 recording media
102 auxiliary storage device
103 memory device
104 CPU
105 interface device
121 service information storage
122 device information storage
123 software information storage
124 user information storage
125 tag information storage
131 application information storage
132 device information storage
133 user information storage
134 registration information storage
201 CPU
202 ROM
203 RAM
204 touch panel
205 auxiliary storage device
206 NFC reader
206a near field communication device
207 digital camera
211 display device
212 input device
501 auxiliary storage device
502 memory device
503 CPU
504 communication interface
505 image interface
506 near field communication device The present application is based on and claims priority to Japanese patent application No. 2018-039122 filed on Mar. 5, 2018, and Japanese Priority Application No. 2018-182887 filed on Sep. 27, 2018, the entire contents of which are hereby incorporated herein by reference.

The invention claimed is:

1. An information processing system comprising:
a terminal; and
an information processing apparatus,
wherein the terminal comprises circuitry configured to
acquire first identification information from outside; and
transmit the first identification information and second identification information for identifying a user of the terminal to the information processing apparatus;
wherein the information processing apparatus comprises circuitry configured to
receive the first identification information and the second identification information; and
cause a device associated with a combination of the first identification information and the second identification information to execute, from among a plurality of processes for providing a service that can be executed by the information processing apparatus, a registered process determined based on the first identification information and the second identification information.

2. The information processing system according to claim 1, wherein the circuitry of the terminal is configured to acquire the first identification information from an external recording medium disposed at a desired position, and the first identification information differs in accordance with the external recording medium.

3. The information processing system according to claim 1, wherein the circuitry of the information processing apparatus is configured to execute a first process associated with a combination of the first identification information and the second identification information to input data, to execute a second process associated with the combination of the first identification information and the second identification information to output the data.

4. An information processing method executed by a terminal and an information processing apparatus, the information processing method comprising:
   causing the terminal to acquire first identification information from outside;
   causing the terminal to transmit the first identification information and second identification information for identifying a user of the terminal to the information processing apparatus;
   causing the information processing apparatus
   to receive the first identification information and the second identification information; and
   causing the information processing apparatus
   to cause a device associated with a combination of the first identification information and the second identification information received in the receiving to execute, from among a plurality of processes for providing a service that can be executed by the information processing apparatus, a registered process determined based on the first identification information and the second identification information.

5. An information processing system comprising:
   an intermediation apparatus comprising circuitry configured to communicate with a device; and
   an information processing apparatus comprising circuitry configured to communicate with the intermediation apparatus,
   wherein the circuitry of the information processing apparatus is configured to
      receive identification information acquired by a terminal from outside; and
      cause the intermediation apparatus to execute, from among a plurality of processes for providing a service that can be executed by the information processing apparatus, a registered process determined based on a combination of the identification information received by the information processing apparatus and the intermediation apparatus, and
   wherein the intermediation apparatus executes the process to control the device.

6. An information processing apparatus comprising:
   circuitry configured to
   receive, from a terminal, via a network, first identification information acquired by the terminal from outside and second identification information for identifying a user of the terminal; and
   cause a device associated with a combination of the first identification information and the second identification information to execute, from among a plurality of processes for providing a service that can be executed by the information processing apparatus, a registered process determined based on the first identification information and the second identification information.

7. The information processing apparatus according to claim 6, wherein the first identification information is recorded on a near field communication (NFC) tag or a radio frequency identification (RFID) tag and acquired by the terminal via NFC or RFID.

8. The information processing apparatus according to claim 6, wherein the first identification information is recorded in a bar code or a two-dimensional code read by the terminal.

9. The information processing apparatus according to claim 6, wherein the first identification information is recorded in an image input by a camera of the terminal.

10. The information processing apparatus according to claim 6, wherein the first identification information is received in a beacon received by the terminal from a near field communication device.

11. The information processing apparatus according to claim 6, wherein the device is any of a projector, a digital signage, an electronic whiteboard, a display, or a printer.

12. The information processing apparatus according to claim 6, wherein the terminal is any of a smartphone, a tablet terminal, a PC, or a mobile phone.

13. The information processing apparatus according to claim 6, wherein the information processing apparatus is a server apparatus including one or more computers.

14. An information processing method comprising:
   receiving, from a terminal, via a network, first identification information acquired by the terminal from outside and second identification information for identifying a user of the terminal; and
   causing a device associated with a combination of the first identification information and the second identification information to execute, from among a plurality of processes for providing a service that can be executed by the information processing apparatus, a registered process determined based on the first identification information and the second identification information.

15. The information processing method according to claim 14, wherein the first identification information is recorded on a near field communication (NFC) tag or a radio frequency identification (RFID) tag and acquired by the terminal via NFC or RFID.

16. The information processing method according to claim 14, wherein the first identification information is recorded in a bar code or a two-dimensional code read by the terminal.

17. The information processing method according to claim 14, wherein the first identification information is recorded in an image input by a camera of the terminal.

18. The information processing method according to claim 14, wherein the first identification information is received in a beacon received by the terminal from a near field communication device.

19. The information processing method according to claim 14, wherein the device is any of a projector, a digital signage, an electronic whiteboard, a display, or a printer.

20. The information processing method according to claim 14, wherein the terminal is any of a smartphone, a tablet terminal, a PC, or a mobile phone.

21. The information processing method according to claim 14, wherein the information processing method is carried out on a server apparatus including one or more computers.

* * * * *